United States Patent
Yuan et al.

(10) Patent No.: US 11,405,805 B2
(45) Date of Patent: Aug. 2, 2022

(54) LINK MAINTENANCE METHOD AND APPARATUS

(71) Applicant: HUAWEI TECHNOLOGIES CO., LTD., Shenzhen (CN)

(72) Inventors: Shitong Yuan, Chengdu (CN); Mingzeng Dai, Shenzhen (CN); You Li, Shenzhen (CN); Jing Liu, Shanghai (CN); Yuanping Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/014,405

(22) Filed: Sep. 8, 2020

(65) Prior Publication Data

US 2020/0404518 A1 Dec. 24, 2020

Related U.S. Application Data

(63) Continuation of application No. PCT/CN2019/077027, filed on Mar. 5, 2019.

(30) Foreign Application Priority Data

Mar. 8, 2018 (CN) .......................... 201810190096.0

(51) Int. Cl.
*H04W 24/10* (2009.01)
*H04W 24/04* (2009.01)
(Continued)

(52) U.S. Cl.
CPC .......... *H04W 24/04* (2013.01); *H04W 24/10* (2013.01); *H04W 28/0236* (2013.01); *H04W 88/14* (2013.01)

(58) Field of Classification Search
CPC . H04W 24/04; H04W 24/10; H04W 28/0236; H04W 88/14; H04W 84/047; H04W 24/02; H04W 74/04
See application file for complete search history.

(56) References Cited

U.S. PATENT DOCUMENTS

2007/0147308 A1 6/2007 Hart
2014/0016537 A1* 1/2014 Khobare ........... H04W 36/0079
370/315
(Continued)

FOREIGN PATENT DOCUMENTS

CN 102064992 A 5/2011
CN 105009474 A 10/2015
(Continued)

OTHER PUBLICATIONS

Chinese Office Action issued in corresponding Chinese Application No. 201810190096.0, dated Feb. 24, 2021, pp. 1-9.
(Continued)

*Primary Examiner* — Chuong A Ngo
(74) *Attorney, Agent, or Firm* — Hauptman Ham, LLP

(57) ABSTRACT

This application relates to the field of communications technologies, and provides a link maintenance method and an apparatus in a relay system, to reduce a service interruption latency, or to avoid service congestion. The method includes: determining, by a first node, one or more candidate neighboring nodes to be measured; measuring, by the first node, the one or more candidate neighboring nodes; determining, by the first node based on a measurement result, whether to establish or delete a backup backhaul link between the first node and the one or more candidate neighboring nodes; and sending, by the first node, a request to a second node, where the request is used to request the second node to establish or delete the backup backhaul link between the first node and the one or more candidate neighboring nodes.

20 Claims, 10 Drawing Sheets

(51) Int. Cl.
H04W 28/02 (2009.01)
H04W 88/14 (2009.01)

(56) References Cited

U.S. PATENT DOCUMENTS

2017/0325250 A1  11/2017  Manolakos et al.
2018/0110037 A1*  4/2018  Yasukawa ............. H04W 48/16
2020/0100124 A1  3/2020  Hampel et al.

FOREIGN PATENT DOCUMENTS

| CN | 106034343 A | 10/2016 |
| CN | 107736004 A | 2/2018 |
| EP | 2501083 A1 | 9/2012 |
| EP | 3116283 A1 | 1/2017 |
| WO | 2017004255 A1 | 1/2017 |

OTHER PUBLICATIONS

3GPP TR 36.806 V0.1.1 (Nov. 2009), 3rd Generation Partnership Project; Technical Specification Group Radio Access Network; Evolved Universal Terrestrial Radio Access (E-UTRA); Relay architectures for E-UTRA (LTE-Advanced) (Release 9), 25 pages.
Chinese Office Action issued in corresponding Chinese Application No. 201810190096.0, dated Aug. 31, 2021, pp. 1-8.
ITRI, Discussion on the topology and protocol stack of IAB. 3GPP TSG-RAN WG2 NR Ad hoc 0118 Vancouver, Canada, January 22-26, 2018, R2-1801348, 4 pages.
3GPP TS 36.300 V15.0.0 (Dec. 2017), 3rd Generation Partnership Project;Technical Specification Group Radio Access Network,Evolved Universal Terrestrial Radio Access (E-UTRA) and Evolved Universal Terrestrial Radio Access Network (E-UTRAN);Overall description;Stage 2(Release 15), 338 pages.
3GPP TR 38.874 V0.1.0 (Feb. 2018), 3rd Generation Partnership Project;Technical Specification Group Radio Access Network;Study on Integrated Access and Backhaul; (Release 15), 11 pages.
International Search Report issued in corresponding International Application No. PCT/CN2019/077027, dated May 23, 2019, National Intellectual Property Administration, PRC, Beijing, China.
3GPP TR 36.806 V0.3.0 (Feb. 2010), 3rd Generation Partnership Project; Technical Specification Group Radio Access Network; Evolved Universal Terrestrial Radio Access (E-UTRA); Relay architectures for E-UTRA (LTE-Advanced) Release 9), 29 pages.
3GPP TR 38.874 1.0.0 (Dec. 2018), 3rd Generation Partnership Project; Technical Specification Group Radio Access Network; Study on Integrated Access and Backhaul;(Release 15), 111 pages.
ATandT, Initial Access and Mobility Requirements for NR. 3GPP TSG RAN1 Meeting #86bis, Lisbon, Portugal, Oct. 10-14, 2016, R1-1609387, 6 pages.
ZTE, RN release procedure. 3GPP TSG RAN WG3 # 69, Madrid, Spain, Aug 23-27, 2010, R3-102177, 2 pages.
Ericsson, Setup procedures for IAB-node and a UE connected to an IAB node . 3GPP TSG-RAN WG3 #99, Athens, Greece, Feb. 26-Mar. 2, 2018, R3-181313, 7 pages.
European Search Report issued in corresponding European Patent Application No. 19763882.8, dated Mar. 22, 2021, pp. 1-18, European Patent Office, Munich, Germany.
India Office Action issued in corresponding India Application No. 202047038032, dated Nov. 26, 2021, pp. 1-8.

* cited by examiner

LINK MAINTENANCE METHOD AND APPARATUS

CROSS-REFERENCE TO RELATED APPLICATIONS

This application is a continuation of International Application No. PCT/CN2019/077027, filed on Mar. 5, 2019, which claims priority to Chinese Patent Application No. 201810190096.0, filed on Mar. 8, 2018. The disclosures of the aforementioned applications are hereby incorporated by reference in their entireties.

TECHNICAL FIELD

The present disclosure relates to communications technologies, and more specifically, to a link maintenance method and an apparatus.

BACKGROUND

High frequency is an important deployment scenario of new radio (NR). Electromagnetic wave at the high frequency has disadvantages such as a poor diffraction capability and severe propagation attenuation. Consequently, there is a high possibility that a coverage hole exists in a network. Due to factors such as deployment costs, it is difficult for an operator to resolve a problem of the coverage hole by depending only on a wired TRP. In this case, it is necessary to introduce a relay having a wireless backhaul link. In this application, a relay node integrating access and backhaul is referred to as a relay transmission reception point (rTRP), to be distinguished from a relay in LTE.

An in-band relay is a relay in which a backhaul link and an access link operate on a same frequency band. The in-band relay has advantages such as high spectral efficiency and low deployment costs, but has an impact on a physical layer protocol. In long term evolution advanced (LTE-A), an in-band relay solution in Release (release) 11 is standardized. However, in LTE-A, a relay network can support only two-hop transmission, that is, the relay node cannot provide service for another relay node.

In NR, a third generation partnership project (3GPP) determines that an integrated access and backhaul (TAB) is used as an important feature to improve NR performance, and the IAB is an in-band relay solution with integrated access and backhaul links. Multi-hop multi-connectivity is a main design objective of NR IAB. In a multi-hop multi-connectivity relay network, a relay node may provide service to another relay node, that is, one relay node may have both a parent node and a child node, where the child node may be another relay, or may be user equipment (UE) served by the relay node. When a relay node has both a parent node and a child node, a relay system has both a backhaul link and an access link. In a multi-hop relay scenario, relays in a network form a relay network, and there is a specific topology structure.

In NR, because a supported bandwidth is relatively high, for example, a downlink bandwidth may be 1 Gbps (giga bits per second, Gbps) or even higher, the bandwidth in the network may also change quickly. If the relay node supporting the IAB has only one backhaul link, congestion may be caused. On the other hand, a high bandwidth may cause a base station or the relay node to use a high frequency. A main feature of the high frequency is that the base station or the relay node is easily affected by an environment, and an instantaneous interruption easily occurs. Consequently, a backhaul link of a wireless relay network changes, and availability of the backhaul link is also affected. Therefore, in the NR IAB, improving availability of the backhaul link is a problem that needs to be resolved.

SUMMARY

Embodiments of this application provide a relay topology maintenance method and an apparatus, to resolve a problem that a backhaul link is unavailable in a multi-hop relay network due to an instantaneous change of network traffic or an instantaneous interruption of a high frequency link.

To achieve the foregoing objective, the following technical solutions are used in the embodiments of this application.

According to a first aspect, a link maintenance method is provided. The method includes: determining, by a first node, one or more candidate neighboring nodes to be measured; measuring, by the first node, the one or more candidate neighboring nodes; determining, by the first node based on a measurement result, whether to establish or delete a backup backhaul link between the first node and the one or more candidate neighboring nodes, and sending, by the first node, a request to a second node, where the request is used to request the second node to establish or delete the backup backhaul link between the first node and the one or more candidate neighboring nodes. In the foregoing technical solution, a service interruption latency in a multi-hop relay network caused by an instantaneous change of network traffic or an instantaneous interruption of a high-frequency link may be reduced, service congestion caused by an instantaneous change of a terminal or traffic of a backhaul link may be avoided, and availability of the backhaul link may be improved.

In a possible implementation of the first aspect, the first node receives a backhaul link measurement threshold configured by the second node, where the backhaul link measurement threshold is used by the first node to determine backhaul link quality. In the foregoing technical solution, a threshold is configured for the first node, so that the first node may autonomously determine whether to establish the backup backhaul link between the first node and the one or more candidate neighboring nodes, thereby reducing a calculation volume of the second node and improving system performance.

In a possible implementation of the first aspect, the first node receives a measurement indication sent by the second node, where the measurement indication includes an identifier of a potential neighboring node, and the identifier of the potential neighboring node is used by the first node to determine the one or more candidate neighboring nodes. In the foregoing technical solution, the second node determines a potential neighboring node to be measured, for the first node, to avoid processing of a measurement message by some simple relay nodes, such as layer 2 relay nodes, and help the second node optimize access network performance.

In a possible implementation of the first aspect, the first node receives a measurement result that is of a potential neighboring node and that is sent by a terminal, where the measurement result of the potential neighboring node is used by the first node to determine the one or more candidate neighboring nodes. In the foregoing technical solution, the first node may measure a neighboring cell by using the terminal, thereby reducing frequency of measuring the neighboring cell by the first node, improving service transmission performance of the first node, and minimizing service interruption caused by measuring the neighboring cell by the first node.

In a possible implementation of the first aspect, if the first node determines to establish a backhaul link between the first node and the one or more candidate neighboring node, the first node initiates a random access process to the one or more candidate neighboring nodes. In the foregoing technical solution, the first node automatically establishes the backup backhaul link between the first node and the one or more candidate neighboring nodes through random access, thereby reducing establishment overheads of the second node. In addition, the first node directly interacts with the one or more candidate neighboring nodes through random access, thereby reducing a time for establishing the backup backhaul link.

In a possible implementation of the first aspect, the determining, by the first node based on a measurement result, whether to establish or delete a backup backhaul link between the first node and the one or more candidate neighboring nodes includes: determining, by the first node, to establish the backup backhaul link between the first node and the one or more candidate neighboring nodes when a condition $M_r-H_{ys}>$Thresh is met, where $M_r$ is a measurement result of the one or more candidate neighboring nodes by the first node, $H_{ys}$ is an event hysteresis parameter, and Thresh is a backhaul link measurement threshold; or determining, by the first node, to delete the backup backhaul link between the first node and the one or more candidate neighboring nodes when a condition $M_r+H_{ys}<$Thresh is met. In the foregoing technical solution, the first node determines, by triggering an event, whether to establish or delete the backup backhaul link, thereby improving stability of the backup backhaul link, and avoiding signaling overheads caused by unnecessary backhaul link establishment.

According to a second aspect, a link maintenance method is provided. The method includes: receiving, by a second node, a first request sent by a first node, where the first request is used to request the second node to establish or delete a backup backhaul link between the first node and one or more candidate neighboring nodes; and sending, by the second node, a response to the first node. In the foregoing technical solution, the second node controls addition or deletion of the backup backhaul link of the first node, to help a network maintain a link of a relay system reduce interference caused by a change of a backhaul link to a system, and improve access network performance.

In a possible implementation of the second aspect, the second node sends a backhaul link measurement threshold to the first node, where the backhaul link measurement threshold is used by the first node to determine backhaul link quality. In the foregoing technical solution, a threshold is configured for the first node, so that the first node may autonomously determine whether to establish the backup backhaul link between the first node and the one or more candidate neighboring nodes, thereby reducing a calculation volume of the second node and improving system performance.

In a possible implementation of the second aspect, the second node sends a measurement indication to the first node, where the measurement indication includes an identifier of a potential neighboring node, and the identifier of the potential neighboring node is used by the first node to determine the one or more candidate neighboring nodes. In the foregoing technical solution, the second node determines a potential neighboring node to be measured, for the first node, to avoid processing of a measurement message by some simple relay nodes, such as layer 2 relay nodes, and help the second node optimize access network performance.

In a possible implementation of the second aspect, the second node sends a second request to the one or more candidate neighboring nodes, where the second request is used by the one or more candidate neighboring nodes to establish or delete a bearer to the second node or a user plane function. In the foregoing technical solution, service interruption caused by interruption or congestion of an in-use backhaul link may be avoided through bearer pre-establishment, and the backup backhaul link may be quickly activated through the pre-established bearer, so that a service interruption latency of the first node is reduced, and service interruption or delay caused by a link change is avoided.

According to another aspect of this application, a first node is provided. The first node is configured to implement a function in the link maintenance method according to any one of the first aspect or the possible implementations of the first aspect. The function may be implemented by hardware, or may be implemented by hardware executing corresponding software. The hardware or the software includes one or more units corresponding to the foregoing function.

In a possible implementation, a structure of a first node device includes a processor and a memory. The memory stores code and data, and the memory is coupled to the processor, the processor is configured to support the first node in performing the link maintenance method provided in any one of the first aspect or the possible implementations of the first aspect. Optionally, the first node may further include a communications interface and a bus. The communications interface is connected to the memory and the processor through the bus.

According to another aspect of this application, a second node is provided. The second node is configured to implement a function in the link maintenance method according to any one of the second aspect or the possible implementations of the second aspect. The function may be implemented by hardware, or may be implemented by hardware executing corresponding software. The hardware or the software includes one or more units corresponding to the foregoing function.

In a possible implementation, a structure of the second node includes a processor and a memory. The memory stores code and data, and the memory is coupled to the processor, the processor is configured to support the second node in performing the link maintenance method provided in any one of the second aspect or the possible implementations of the second aspect. Optionally, the second node may further include a communications interface and a bus. The communications interface is connected to the memory and the processor through the bus.

According to another aspect of this application, a computer-readable storage medium is provided. The computer-readable storage medium stores an instruction, and when the instruction is run on a computer, the computer is enabled to perform the link maintenance method provided in any one of the first aspect or the possible implementations of the first aspect, or perform the link maintenance method provided in any one of the second aspect or the possible implementations of the second aspect.

According to another aspect of this application, a computer program product including an instruction is provided. When the computer program product is run on a computer, the computer is enabled to perform the link maintenance method provided in any one of the first aspect or the possible implementations of the first aspect, or perform the link maintenance method provided in any one of the second aspect or the possible implementations of the second aspect.

According to another aspect of this application, a communications system is provided. The communications system includes a plurality of nodes, and the plurality of nodes include a first node and a second node, where the first node is the first node provided in the foregoing aspects, and is configured to support the first node in performing the link maintenance method provided in any one of the first aspect or the possible implementations of the first aspect; and/or the second node is the second node provided in the foregoing aspects, and is configured to support the second node in performing the link maintenance method provided in any one of the second aspect or the possible implementations of the second aspect.

It may be understood that any one of the apparatus, the computer storage medium, or the computer program product that perform the link maintenance method and that are provided above are configured to perform the corresponding method provided above. Therefore, for beneficial effects of the apparatus, the computer storage medium, or the computer program product, refer to the beneficial effects in the corresponding method provided above. Details are not described herein again.

It may be understood that any one of the apparatus, the computer storage medium, or the computer program product that perform the link maintenance method and that are provided above are configured to perform the corresponding method provided above. Therefore, for beneficial effects of the apparatus, the computer storage medium, or the computer program product, refer to the beneficial effects in the corresponding method provided above. Details are not described herein again.

DETAILED DESCRIPTION OF ILLUSTRATIVE EMBODIMENTS

The following describes the technical solutions in the embodiments of the present invention with reference to the accompanying drawings in the embodiments of the present invention. Definitely, the described embodiments are merely some but not all of the embodiments of the present invention. All other embodiments obtained by a person skilled in the art based on the embodiments of the present invention without creative efforts shall fall within the protection scope of the present disclosure.

It should be understood that names of all nodes and messages in this application are merely names set for ease of description in this application, and may be different in an actual network. It should not be understood that the names of all the nodes and the messages are limited in this application, any name that has a function the same as or similar to that of the node or the message used in this application is considered as a method or equivalent replacement in this application, and falls within the protection scope of this application. Details are not described below again.

In consideration of a high bandwidth of a future wireless network, an integrated access and backhaul (IAB) solution is considered to be introduced in NR, to further reduce deployment costs and improve deployment flexibility. Therefore, a relay with integrated access and backhaul is introduced. In this application, a relay node integrating access and backhaul is referred to as a relay transmission reception point (rTRP), to be distinguished from a relay in LTE. A 3rd generation partnership project (3GPP) has determined to use NR TAB as a standardization target of Release (release) 16, and the NR IAB is currently in a research start phase.

However, due to a requirement for a high bandwidth in the NR, bandwidths of an access link and a backhaul link on a relay node that integrates access and backhaul are multiplied or dozens of times higher than those in conventional LTE. Therefore, introducing high frequency to the IAB is an option. On the other hand, at an early stage of deployment, more IAB nodes may work on a frequency band of 6 GHz or lower. For high frequency, instantaneous interruption may be caused from being affected by the environment. Consequently, a backhaul link may be unavailable. However, on the other hand, the NR supports multi-hop wireless relay. Therefore, there may be a plurality of options for routing of a backhaul link of the relay node, and a change of a high frequency link may cause a change of a routing topology of an IAB node, thereby affecting performance of the IAB node. To ensure the IAB in the NR, especially when a backhaul link of the IAB changes, maintaining an available backhaul link of the IAB and maintaining a route to a network is a problem that needs to be resolved.

Figure 1:
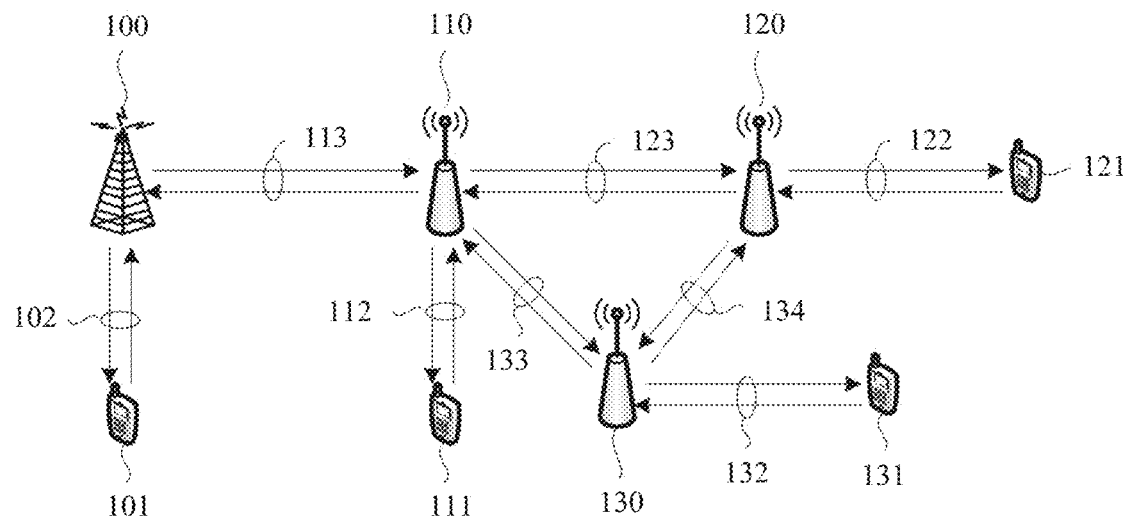
FIG. 1 is a schematic structural diagram of a communications system to which embodiments of this application are applicable.

FIG. 1 is a schematic structural diagram of a communications system to which embodiments of this application are applicable.

It should be noted that the communications system mentioned in the embodiments of this application includes but is not limited to a narrowband internet of things (NB-IoT) system, a long term evolution (LTE) system, a next-generation 5G mobile communications system or a communications system after 5G, or a device to device (D2D) communications system.

In the communications system shown in FIG. 1, an integrated access and backhaul IAB system is provided. One IAB system includes at least one base station 100, one or more user equipments (UE) 101 served by the base station 100, one or more relay nodes rTRPs 110, and one or more UEs 111 served by the rTRPs 110. Usually, the base station 100 is referred to as a donor gNB (DgNB). The rTRP 110 is connected to the base station 100 through a wireless backhaul link 113. In this application, the donor gNB is also referred to as a donor node, namely, a donor node. The base station includes but is not limited to an evolved NodeB (eNB), a radio network controller (RNC), a node B (NB), a base station controller (BSC), a base transceiver station (BTS), and a home base station (for example, a home evolved NodeB, or a home NodeB, HNB), a baseband unit (BBU), a next-generation new radio base station (for example, a gNB), or the like.

The integrated access and backhaul system may also include a plurality of other relay nodes, such as an rTRP 120 and an rTRP 130. The rTRP 120 is connected to the relay node rTRP 110 through the wireless backhaul link 123 to access the network. The rTRP 130 is connected to the relay node rTRP 110 through the wireless backhaul link 133 to access the network. The rTRP 120 serves the one or more UEs 121, and the rTRP 130 serves the one or more UEs 131. In FIG. 1, both the relay nodes rTRP 110 and rTRP 120 are connected to the network through the wireless backhaul links. In this application, the wireless backhaul links are viewed from a perspective of the relay node. For example, the wireless backhaul link 113 is a backhaul link of the relay node rTRP 110, and the wireless backhaul link 123 is a backhaul link of the relay node rTRP 120. As shown in FIG. 1, a relay node, for example, 120, may be connected to another relay node 110 through a wireless backhaul link, for example, 123, to be connected to the network. In addition, the relay node may be connected to the network through multiple levels of wireless relay nodes. Usually, a node that provides a resource of the wireless backhaul link, for example, 110, is referred to as a parent node of the relay node 120, and 120 is referred to as a child node of the relay node 110. Usually, the child node may be considered as a user equipment UE of the parent node. It should be understood that in the integrated access and backhaul system shown in FIG. 1, one relay node is connected to one parent node. However, in a future relay system, to improve reliability of the wireless backhaul link, one relay node, for example, 120, may have a plurality of parent nodes that simultaneously provide a service for one relay node. For example, the rTRP 130 in the figure may also be connected to the relay node rTRP 120 through a backhaul link 134, that is, both the rTRP 110 and the rTRP 120 are upper level nodes of the rTRP 130. In this application, the user equipments UEs 101, 111, 121, and 131 may be static or mobile devices. For example, the mobile devices may be a mobile phone, an intelligent terminal, a tablet computer, a notebook computer, a video game console, a multimedia player, or even a mobile relay node. The static devices are usually located at fixed locations, such as computers and access points (connected to the network through wireless links, such as static relay nodes). Names of the relay nodes rTRPs 110, 120, and 130 do not limit a scenario or a network in which the relay nodes rTRPs 110, 120, and 130 are deployed, and may be any other name such as a relay or RN. For ease of description, the rTRPs are used in this application.

In FIG. 1, radio links 102, 112, 122, 132, 113, 123, 133, and 134 may be bidirectional links, including uplink and downlink transmission links. Specifically, the wireless backhaul links 113, 123, 133, and 134 may be used by the parent node to provide a service for the child node, for example, a parent node 100 provides a wireless backhaul service for a child node 110. It should be understood that uplink and downlink of the backhaul link may be separated. To be specific, the uplink and the downlink are not transmitted through a same node. The downlink transmission refers to transmitting information or data from the parent node, such as a node 100, to the child node, such as a node 110. The uplink transmission refers to transmitting information or data from the child node, such as the node 110, to the parent node, such as the node 100. The node is not limited to a network node or a UE. For example, in a D2D scenario, the UE may be used as a relay node to serve another UE. In some scenarios, the wireless backhaul link may also be an access link. For example, for the node 110, the backhaul link 123 may also be considered as an access link, and the backhaul link 113 is also an access link of the node 100. It should be understood that the parent node may be a base station or a relay node, and the child node may be a relay node or a UE having a relay function. For example, in a D2D scenario, the child node may also be the UE.

The relay nodes shown in FIG. 1, such as 110, 120, and 130, may have two existing forms. One form is that the relay node exists as an independent access node and may independently manage a UE accessing the relay node. In this case, the relay node usually has an independent physical cell identifier (PCI). A relay in this form usually needs to have a complete protocol stack function, for example, a radio resource control (RRC) function. The relay is usually referred to as a layer 3 relay. However, a relay node in another form does not have an independent PCI, belongs to a same cell with a donor node, such as a donor eNB or a donor gNB, and does not manage a user. Protocol stacks of a layer 2 relay and the layer 3 relay are shown in FIG. 2 to FIG. 5. The donor node is a node that may access a core network through the node, or is an anchor base station in a radio access network. The donor node may access the network through the anchor base station. The anchor base station is responsible for processing data at a packet data convergence protocol (PDCP) layer, receiving data from the core network and forwarding the data to the relay node, or receiving data from the relay node and forwarding the data to the core network.

Figure 2:
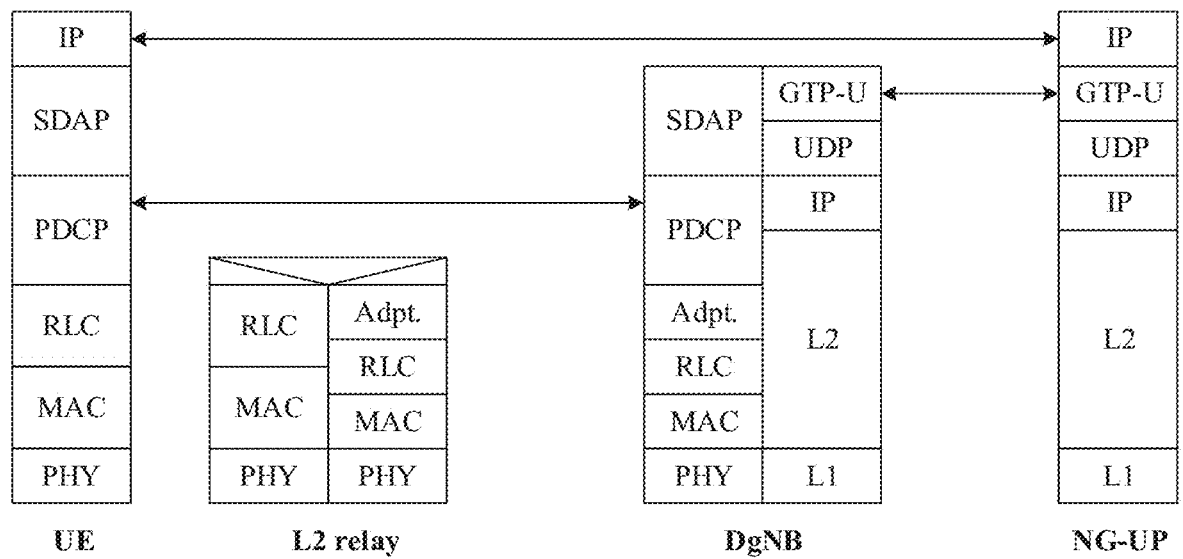
FIG. 2 and FIG. 3 are architectural diagrams of protocol stacks of a user plane and a control plane of a layer 2 relay system respectively.
Figure 3:
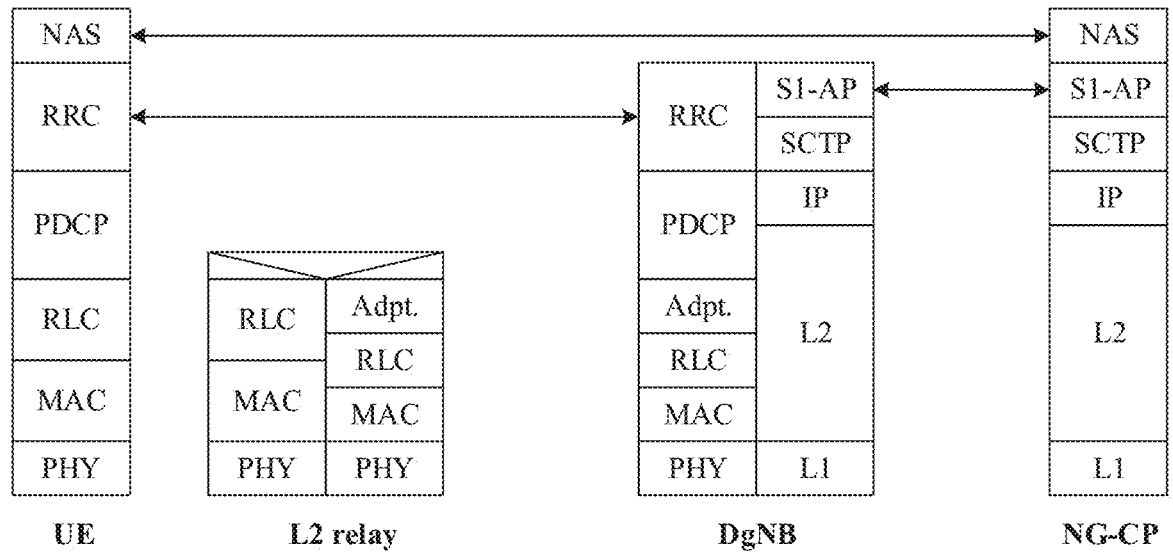

FIG. 2 and FIG. 3 are architectural diagrams of protocol stacks of a user plane and a control plane of a layer 2 relay system respectively. A next generation user plane (NG-UP) in the figure is mainly a user plane gateway, and a next generation control plane (NG-CP) is a control plane node. A protocol layer of a user plane of a UE includes a physical (PHY) layer, a medium access control (MAC) layer, a radio link control (RLC) layer, a PDCP layer, a service data adaptation protocol (SDAP) layer, and an internet protocol (IP) layer. The SDAP layer mainly provides a service adaptation function, including a quality of service (QoS) management function and a flow management function. An air interface protocol layer for communication between a layer 2 (L2) relay and the UE mainly includes a PHY layer, a MAC layer, and an RLC layer. A protocol stack of an interface that communicates with the donor node through the backhaul link includes a PHY layer, a MAC layer, an RLC layer, and an adaptation (Adpt.) layer. The adaptation layer mainly provides functions including bearer management and security management. Correspondingly, a protocol stack of an interface for communication between the donor node, namely, the DgNB, and the layer 2 relay includes a PHY layer, a MAC layer, an RLC layer, an Adpt. layer, a PDCP layer, and an SDAP layer. The DgNB and the NG-UP are usually connected in a wired manner, and a service bearer is usually established by using a tunnel. A protocol stack of the NG-UP corresponding to the DgNB includes an L1, an L2, an IP layer, a user datagram protocol (UDP) layer, and a general packet radio service tunneling protocol user plane (GTP-U) layer. Correspondingly, a protocol stack of the NG-UP includes an L1, an L2, an IP layer, a UDP layer, a GTP-U layer, and an IP layer. The protocol layers and functions are well known by a person of ordinary skill in the art, and details are not described.

Similarly, FIG. 3 shows a structure of a protocol stack of a control plane of a layer 2 relay system. A protocol stack of a UE includes a PHY layer, a MAC layer, an RLC layer, a PDCP layer, an RRC layer, and a non-access stratum (NAS) layer. A protocol stack of a control plane of a layer 2 relay is the same as a protocol stack of a user plane of the layer 2 relay. Details are not described herein again. A protocol stack of a control plane interface for communication between the DgNB and the layer 2 relay includes a PHY layer, a MAC layer, an RLC layer, an Adpt. layer, a PDCP layer, and an RRC layer. The DgNB and a network element of a core network control plane NG-CP are usually connected in a wired manner. A protocol stack of the DgNB on the interface includes an L1, an L2, an IP layer, a stream control transmission protocol (SCTP) layer, and an S1 application protocol (S1-AP) layer. S1 is a code of the interface. Correspondingly, a protocol stack of the NG-CP on the S1 interface includes: an L1, an L2, an IP layer, an SCTP layer, an S1-AP layer, and a NAS layer. The NAS layer corresponds to a NAS layer of a UE.

Figure 4:
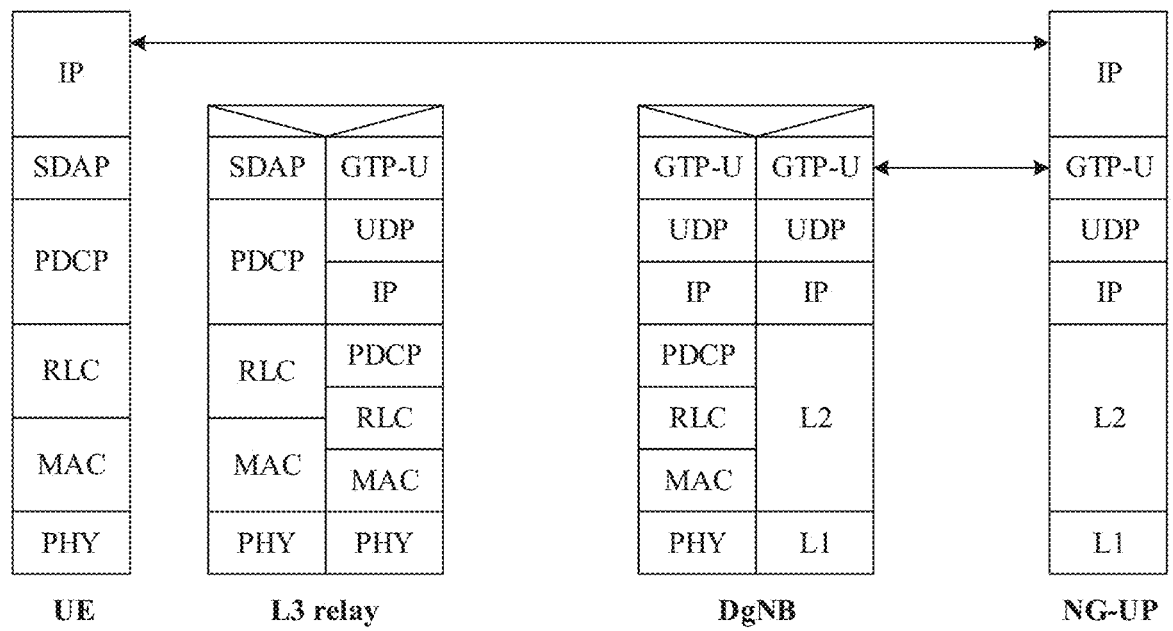
FIG. 4 and FIG. 5 are architectural diagrams of protocol stacks of a user plane and a control plane of a layer 3 relay system respectively.
Figure 5:
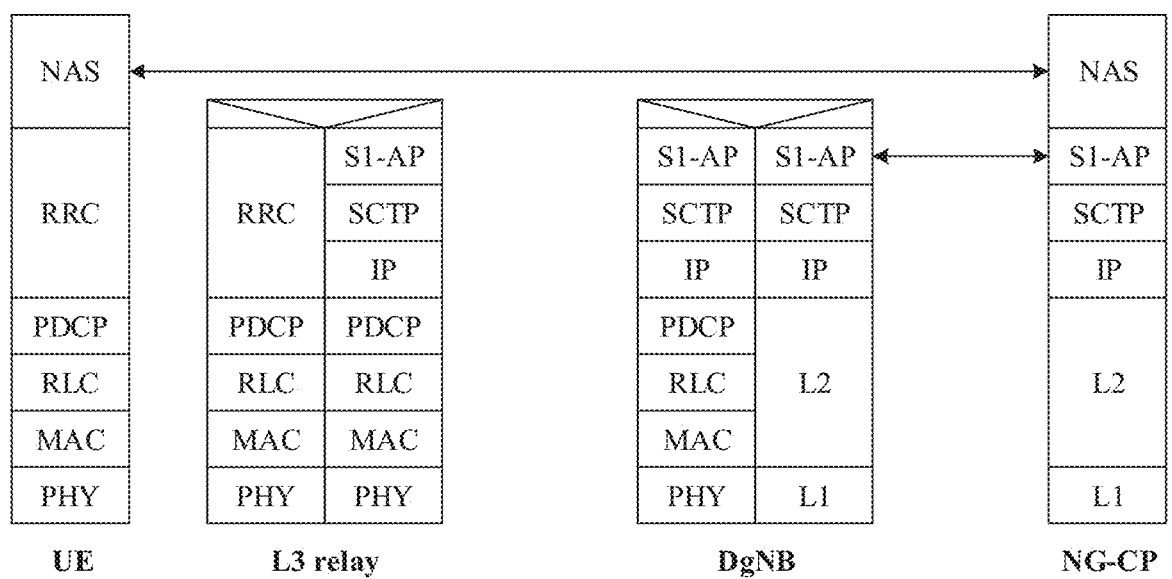

Similarly, FIG. 4 and FIG. 5 are architectural diagrams of protocol stacks of a user plane and a control plane of a layer 3 relay system respectively. Different from the protocol stack of the user plane in the layer 2 relay system, the layer 3 relay and the UE support a complete air interface protocol stack on an air interface. The complete air interface protocol stack includes: a PHY layer, a MAC layer, an RLC layer, a PDCP layer, and an SDAP layer. On an interface between the relay and the DgNB, a protocol stack of the relay node includes a PHY layer, a MAC layer, an RLC layer, a PDCP layer, an IP layer, a UDP layer, and a GTP-U layer. Correspondingly, a protocol stack of an S1 interface of the DgNB includes a PHY layer, a MAC layer, an RLC layer, a PDCP layer, an IP layer, a UDP layer, and a GTP-U layer. Another structure is the same as the structure of the protocol stack of the user plane of the layer 2 relay system Details are not described again.

FIG. 5 shows a structure of a protocol stack of a control plane of a layer 3 relay protocol. Different from the protocol stack of the control plane in the layer 2 relay system, in the structure of the protocol stack of the control plane of the layer 3 relay system, the layer 3 relay and the UE support a complete control plane protocol stack on an air interface. The complete control plane protocol stack includes a PHY layer, a MAC layer, an RLC layer, a PDCP layer, and an RRC layer. A protocol stack of an interface between the layer 3 relay and the DgNB includes a PHY layer, a MAC layer, an RLC layer, a PDCP layer, an IP layer, an SCTP layer, and an S1-AP layer. Correspondingly, the protocol stack of the interface between the DgNB and the layer 3 relay includes a PHY layer, a MAC layer, an RLC layer, a PDCP layer, an IP layer, an SCTP layer, and an S1-AP layer. Another structure is the same as the structure of the protocol stack of the control plane of the layer 2 relay system. Details are not described again.

For ease of description, the relay node is referred to as a first node in the following, a donor base station or a parent node of the first node is referred to as a second node, a cell that is physically adjacent to a cell in which the first node is located and that has specific signal overlapping coverage is referred to as a neighboring cell, and a base station or the relay node that forms the neighboring cell is referred to as a neighboring node. When the relay node is a layer 2 relay, a cell in which the relay node is located is the same as a cell of the donor node, and a neighboring node of the relay node is a neighboring node of the donor node. When the relay node is a layer 3 relay, the neighboring node is a cell that is physically adjacent to a cell of the relay node and that has specific signal overlapping coverage. The relay node establishes an X2 interface between the relay node and the neighboring node through the donor node, but the neighboring node may not be a neighboring node of the donor node. Usually, the neighboring cell is a cell that has specific coverage and that is formed by a signal transmitted by the neighboring node. The X2 interface is an interface for communication between base stations. It should be understood that X2 herein is merely used to represent an interface between the base stations, but this does not mean that this is a limitation on a name, or a name of the interface limits an application scope of this application. The name of the interface may also be another name. The first node may be any device having a relay function, such as a base station, a relay node, or UE having a relay function. The second node is usually the donor base station or a parent node of the first node. It should be understood that the first node and the second node may not directly communicate with each other through a backhaul link. To be specific, the first node and the second node may be connected to each other through a multi-hop delay. The X2 interface connecting the neighboring node with the first node may not be directly established in a wired or wireless manner, and may be established in another manner, for example, a tunnel.

Similarly, a candidate neighboring node and a potential neighboring node are defined. The candidate neighboring node is a neighboring node that is determined to perform measurement, and the candidate neighboring node may be the donor node of the first node, namely, some or all neighboring nodes that are configured by the second node for the first node and that are in the potential neighboring node, or may be a neighboring node selected by the first node from the potential neighboring node sent by the second node. For example, when a measurement result that is of the potential neighboring node and that is obtained by a terminal through measurement is greater than a threshold, the potential neighboring node is used as a candidate node. The potential neighboring node is the first node or a neighboring node of the cell in which the first node is located, and the potential neighboring node may be used as the parent node of the first node, or may be used as all neighboring nodes of the candidate neighboring node of the first node. Whether the potential neighbor node can be the candidate node is determined based on the measurement result of the potential neighboring node by the terminal. A backup backhaul link is a backhaul link that can implement transmission through the node. To be specific, as the parent node of the first node, the backup backhaul link may be in an inactive (inactive) state, or may be in an active (active) state, and this specifically depends on configuration.

To maintain the backhaul link, the first node, namely, the relay node, determines a candidate neighboring node to be measured, the first node measures the candidate neighboring node, determines, based on the measurement result, whether to establish or delete a backhaul link between the first node and the candidate neighboring node, and sends a request to the second node, where the request is used to request the second node to establish or delete the backup backhaul link between the first node and the candidate neighboring node. The first node may determine the candidate neighboring node to be measured based on a measurement indication sent by the second node, a measurement result that is of the potential neighboring node, that is measured by the terminal, and that is sent by the second node, or a measurement result that is of a potential neighboring node and that is sent by the terminal to the first node. If determining to measure the candidate neighboring node, the first node may send a measurement configuration request to the second node to obtain configuration information of a channel state information-reference signal (CSI-RS) of the candidate neighboring node, and measure the CSI-RS of the neighboring cell, or the first node measures a synchronization signal/physical broadcast channel block (SS/PBCH block) of the neighboring cell. When the measurement result meets a threshold, it is considered that the candidate neighboring node may be used as a candidate of the backup backhaul link.

The first node sends a first request to the second node, and the second node receives the first request sent by the first node. The first request is used to request the second node to establish or delete the backup backhaul link between the first node and the candidate neighboring node. The second node may send a response to the first node. If the first node determines to establish the backhaul link between the first node and the candidate neighboring node, the first request is used to request the second node to establish the backup backhaul link between the first node and the candidate neighboring node. Alternatively, if the first node determines to delete the backhaul link between the first node and the candidate neighboring node, the first request is used to request the second node to delete the backup backhaul link between the first node and the candidate neighboring node.

After receiving the first request, the second node sends a second request to the candidate neighboring node, where the second request is used by the candidate neighboring node to establish or delete a bearer to the second node or a user plane function. If the first request is used to request the second node to establish the backup backhaul link between the first node and the candidate neighboring node, the second request is used by the candidate neighboring node to establish the bearer to the second node or the user plane function. Alternatively, if the first request is used to request the second node to delete the backup backhaul link between the first node and the candidate neighboring node, the second request is used by the candidate neighboring node to delete the bearer to the second node or the user plane function.

Figure 6:
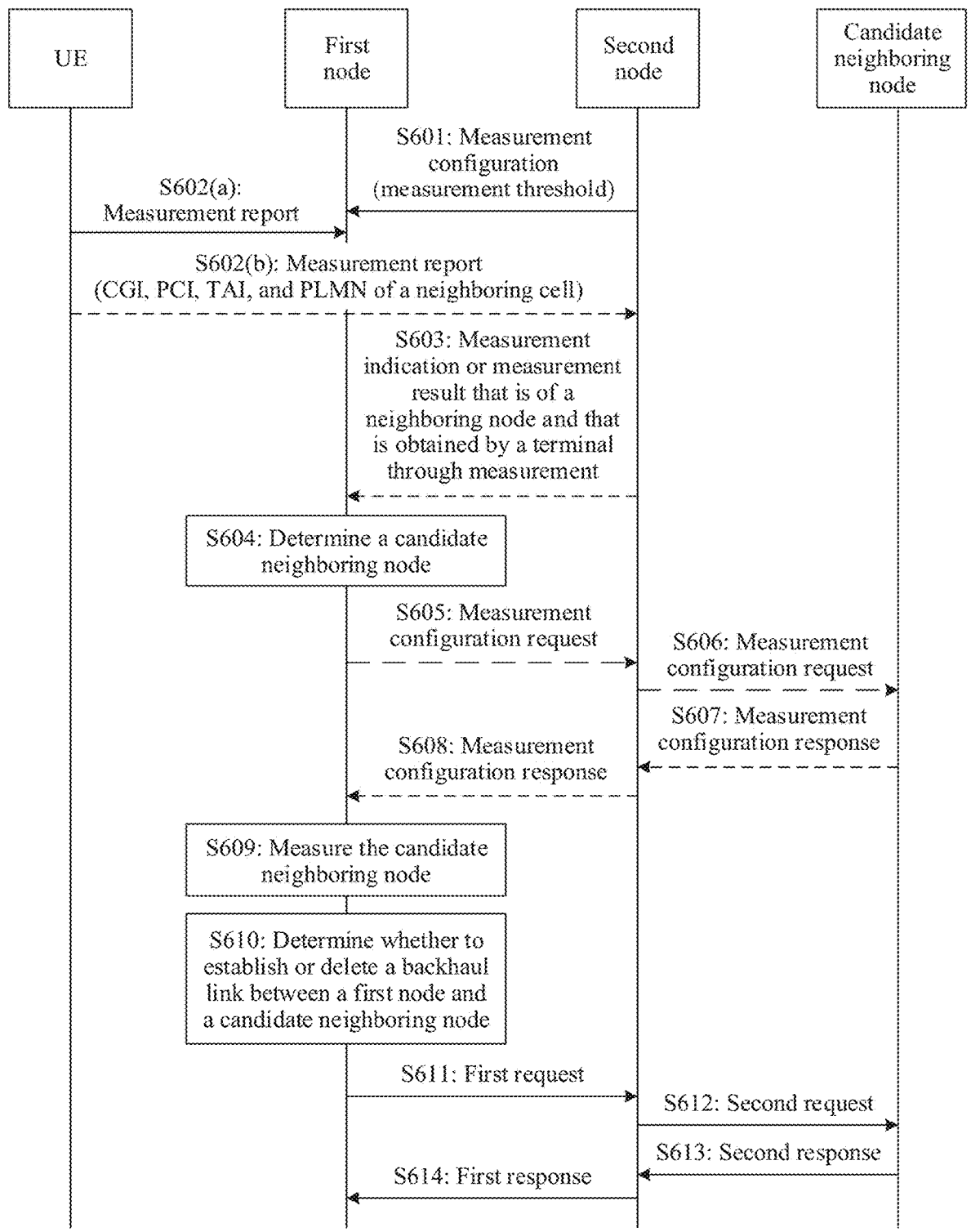
FIG. 6 is a flowchart of establishing a backup backhaul link between a relay node and a neighboring node according to an embodiment of this application.

FIG. 6 is a flowchart of establishing a backup backhaul link between a relay node and a neighboring node according to an embodiment of this application. Main steps of the embodiment in FIG. 6 are as follows.

S601: A first node receives measurement configuration information sent by a second node, where the measurement configuration information includes a backhaul link measurement threshold, and the backhaul link measurement threshold is used by the first node to determine backhaul link quality. The backhaul link measurement threshold is used to determine, when the first node measures a candidate neighboring node, whether the candidate neighboring node can be used as a parent node of the first node. The measurement configuration information may further include a hysteresis parameter (hysteresis. $H_{ys}$) of a candidate link, where $H_{ys}$ of the candidate link is used to determine that an entry condition or a leave condition of an event is met, to trigger the first node to establish or delete a backhaul link between the first node and the candidate neighboring node.

In an optional solution, the second node may further include a terminal measurement threshold in measurement configuration. The terminal measurement threshold is used by the first node to determine, when receiving a terminal measurement result, whether there is a need to measure a neighbor measured by the terminal. The terminal measurement threshold is used by the terminal to determine whether the measurement result meets a specific signal strength, and the backhaul link measurement threshold is used by the first node to measure the neighboring node. The terminal measurement threshold may be the same as or different from the backhaul link measurement threshold. Specific configuration is not limited in this application.

The measurement configuration may be independent of the following steps. In this embodiment, it does not mean that subsequent step S602(a) or S602(b) and subsequent steps are definitely performed immediately after step S601. It should be understood that the measurement configuration is used by the first node to determine whether to establish or delete the backhaul link between the first node and the candidate neighboring node. Therefore, execution of the following steps S602(a) or S602(b) and S603 does not depend on step S601.

It should be understood that the second node may configure a plurality of backhaul link measurement thresholds for the first node. For example, a first backhaul link measurement threshold is for an SS/PBCH block, and a second backhaul link measurement threshold is for a dedicated reference signal, for example, a CSI-RS. Alternatively, the second node may configure only one backhaul link measurement threshold, and whether the backhaul link measurement threshold is for an SS/PBCH block or a dedicated reference signal is not distinguished. A specific quantity of backhaul link measurement thresholds that are configured and whether to distinguish whether the backhaul link is for different reference signals depend on a protocol definition or configuration. This is not limited in this application.

S602(a): UE sends a measurement report to the first node. The first node receives the measurement report sent by the terminal. The measurement report includes a measurement result of a potential neighboring node. The terminal accesses a network through the first node, and the measurement result of the potential neighboring node is used by the first node to determine the candidate neighboring node. If the first node is a layer 3 relay, that is, the first node is an independent cell and includes an RRC function, the first node may configure UE belonging to the first node to perform neighbor measurement, and the UE belonging to the first node sends the measurement result to the first node. The UE accesses the network through the first node, and the first node has the RRC function. That is, the first node is used as a layer 3 relay node to provide a service for the UE. If the first node is a layer 2 relay, this step is not performed. The measurement report includes at least one of the following parameters: a cell global identifier (CGI), a physical cell identifier (PCI), and a tracking area identifier (TAI) that are of the neighboring cell, a public land mobile network (PLMN), reference signal received power (RSRP) corresponding to the CGI or the PCI, an index that is of the SS/PBCH block and that is obtained by the terminal through measurement or the CSI-RS, and location information of the terminal. The location information of the terminal may be global positioning system (GPS) information. It should be understood that in different solutions, the UE may send the measurement report to the first node (for example, the first node is the layer 3 relay), or send the measurement report to the second node (for example, the first node is the layer 2 relay). If the UE sends the measurement report to the first node, step S602(*a*) is performed. In this case, step S602(*b*) and step S603 are not performed. The UE sends the measurement report to the second node, and the second node sends a measurement indication or the measurement result that is of the neighboring node and that is obtained by the terminal through measurement, to the first node. In this case, steps S602(*b*) and S603 are performed. When S602(*a*) is performed, step S604 is performed, that is, either step S602(*a*) or steps S602(*b*) and S603 are performed.

S602(*b*): The UE sends the measurement report to the second node. If the first node is the layer 2 relay, because there is no RRC function on an access link, a neighboring cell discovery function is measured by the second node by configuring UE to which the second node belongs, to discover a new cell or find that a neighboring cell is removed. In this case, the second node obtains a status of the neighboring cell, that is, whether there is the new neighboring cell, or whether a neighboring cell is removed, by receiving the measurement report of the UE. Parameters of the measurement report are described above, and details are not described again.

S603: The first node receives the measurement indication sent by the second node, where the measurement indication includes an identifier of the potential neighboring node, and the identifier of the potential neighboring node is used by the first node to determine the candidate neighboring node, or the first node receives the measurement result that is of the potential neighboring node, that is obtained by the terminal through measurement, and that is sent by the second node, the terminal accesses the network through the first node, and the measurement result of the potential neighboring node is used by the first node to determine the candidate neighboring node.

After receiving the measurement report sent by the UE, the second node determines the neighboring node to be measured by the first node, that is, the second node determines, based on a measurement result that is of the neighboring cell and that is obtained by the UE through measurement, the neighboring node to be measured by the first node. If the measurement result that is of the neighboring cell and that is obtained by the UE through measurement, such as RSRP, is greater than a specific threshold, the neighboring node corresponding to the neighboring cell may be used as the potential neighboring node of the first node, and the result is sent to the first node in the measurement indication. The measurement indication may include a plurality of potential neighboring nodes. Because results that are of a same neighboring node and that are obtained by a plurality of UEs through measurement may be different, the second node may select a measurement result having largest RSRP as the measurement result of the neighboring cell, or select a measurement result of one UE closest to the first node as the measurement result of the neighboring cell. Alternatively, the second node may perform weighted averaging on measurement results that are of a same neighboring node and that are obtained by all UEs through measurement, and a weighted averaging result is used as the measurement result of the neighboring cell. A specific implementation is not limited in this application.

In an optional solution, if the second node sends the measurement indication to the first node, the measurement indication may include configuration information of a CSI-RS of the neighboring node. The configuration information of the CSI-RS includes a time-frequency resource location of the CSI-RS, a periodicity, a start system sending frame number, a sending slot number, a sending subframe number, a quantity of sending times, and the like. If the measurement indication includes the CSI-RS, before sending the measurement indication to the first node, the second node further sends a measurement configuration request to the neighboring node, to request the configuration information of the CSI-RS of the neighboring node. Details are not described herein again.

In an optional solution, the second node sends the measurement result that is of the neighboring cell and that is received from the UE, to the first node for processing. It should be understood that because the first node is the layer 2 relay, that there is no RRC function on an access link means that the first node does not process an RRC layer of the UE, and does not mean that there is no RRC function between the first node and the second node. Therefore, the first node may process an RRC message from the second node, but not process an RRC message of the UE. Therefore, the second node may send the measurement result from the UE to the first node without processing. A measurement result that is of the neighboring node, that is obtained by a terminal through measurement, and that is sent by the second node to the first node is associated with a neighboring node. The neighboring node is referred to as a potential neighboring node, that is, may be referred to as a neighboring node of a parent node of the first node.

In an optional solution, the measurement configuration in step S601 may also be sent to the first node in step S603. If the measurement configuration is sent to the first node together with the measurement indication or the measurement result that is of the neighboring node and that is obtained by the terminal through measurement, step S601 is optional. In addition, the measurement configuration may be sent to the first node when the second node sends the measurement indication or the measurement result that is of the neighboring node and that is obtained by the terminal through measurement, to the first node for the first time, and the measurement configuration is subsequently used. Optionally, the second node may also include the measurement configuration when subsequently sending the measurement indication or the measurement result that is of the neighboring node and that is obtained by the terminal through measurement, to the first node, to reconfigure the measurement configuration, or even send a measurement reconfiguration message to the first node to update the measurement configuration.

The measurement indication includes an identifier of the candidate neighboring node, and the identifier may be one of a CGI or a PCI. The measurement result that is of the neighboring node and that is obtained by the terminal through measurement includes the RSRP that is of the neighboring node and that is obtained by the terminal through measurement and the identifier of the neighboring node corresponding to the RSRP, and may further include measured location information of the terminal, for example, the global positioning system information.

S604: The first node determines the candidate neighboring node. If the second node sends the measurement indication to the first node, because the measurement result that is of the neighboring node and that is in the measurement indication has been processed by the second node, the first node may select some or all of the neighboring nodes for measurement, and select the potential neighboring node to be measured as the candidate neighboring node. The first node may perform selection based on a previous measurement result, or a measurement result of a cell that is not in a list of neighboring cells. A specific selection rule is not limited in this application.

If the second node sends the measurement result that is of the neighboring node and that is obtained by the terminal through measurement, and the neighboring node obtained by the terminal through measurement is the potential neighboring node of the first node, whether to measure the potential neighboring node needs to be determined based on the measurement result that is of the neighboring cell and that is obtained by the terminal through measurement. For a same potential neighboring node, results obtained by a plurality of terminals through measurement may be different. The first node may select a measurement result with largest RSRP as the measurement result of the neighboring cell, or select a measurement result obtained by one terminal closest to a location of the first node through measurement as the measurement result of the neighboring cell. Alternatively, the first node may perform weighted averaging on measurement results that are of a same neighboring node and that are obtained by all UEs through measurement, and a weighted averaging result is used as the measurement result of the neighboring cell. A specific implementation is not limited in this application.

If the first node needs to measure the candidate neighboring node by using the CSI-RS, step S605 is performed. Otherwise, if the first node may measure the candidate neighboring node by using the SS/PBCH block of the neighboring node, step S609 is directly performed. Whether the neighboring cell is measured by using the SS/PBCH block or the CSI-RS may be configured. For example, a manner that is for measuring the neighboring cell of the first node may alternatively be a manner defined in a protocol. This is not limited in this application.

S605: If the first node measures the neighboring cell by using the CSI-RS, the first node may send the measurement configuration request to the second node, to request the candidate neighboring node to send the configuration information of the CSI-RS. The measurement configuration request includes an identifier of the first node and an identifier of the candidate neighboring node. The identifier is described above, and details are not described again. The measurement configuration request may further include location information of the first node, for example, GPS information, and information about a measured beam, for example, an index of the beam.

S606: After receiving the measurement configuration request sent by the first node, the second node forwards the measurement configuration request to the candidate neighboring node. Content included in the measurement configuration request is described in step S605, and details are not described again.

S607: After receiving the measurement configuration request, the candidate neighboring node determines the configuration information of the CSI-RS based on a parameter included in the measurement configuration request, and sends a measurement configuration response to the second node, where the measurement configuration response includes the configuration information of the CSI-RS, and the configuration information of the CSI-RS is described above, and details are not described again.

S608: After receiving the measurement configuration response of the candidate neighboring node, the second node forwards the measurement configuration response to the first node, where content included in the measurement configuration response is described in step S607, and details are not described again.

S609: The first node measures the candidate neighboring node. If the first node receives the configuration information of the CSI-RS of the candidate neighboring node, the first node performs measurement on a given resource of the CSI-RS based on the configuration information of the CSI-RS. If the first node does not receive the CSI-RS of the candidate neighboring node, the first node measures the SS/PBCH block of the candidate neighboring node, and obtains the measurement result. The first node determines, based on the obtained measurement result, whether the candidate neighboring node can be used as a candidate node of a backhaul link.

It should be understood that measurement of the candidate node further includes measurement performed by the first node on an established backup backhaul link to the neighboring node, and measurement performed on the neighboring node of the established backup backhaul link may be periodic or may be triggered by an event. For example, when quality that is of a backup backhaul link to a neighboring node and that is obtained by the UE through measurement is lower than a threshold, the first node is triggered to perform measurement.

S610: The first node determines, based on the measurement result, whether to establish or delete the backhaul link between the first node and the candidate neighboring node. Specifically, when a condition $M_r - H_{ys} > Thresh$ is met, the first node determines that the entry condition of the event is met. $M_r$ is a measurement result of the candidate neighboring node by the first node, $H_{ys}$ is an event hysteresis parameter, and Thresh is a backhaul link measurement threshold. The first node sends an addition request of the backup backhaul link to the second node. The addition request of the backup backhaul link is used by the second node to establish the backup backhaul link between the first node and the candidate neighboring node. Alternatively, when a condition $M_r + H_{ys} < Thresh$ is met, the first node determines that the leave condition of the event is met, and the first node sends a deletion request of the backup backhaul link to the second node, where the deletion request of the backup backhaul link is used by the second node to delete the backup backhaul link between the first node and the candidate neighboring node.

It should be understood that a trigger entry condition may also meet $M_r - H_{ys} \geq Thresh$, and a trigger leave condition may also meet $M_r + H_{ys} \leq Thresh$.

S611: The first node sends a first request to the second node. The first request is used by the second node to establish or delete the backup backhaul link between the first node and the candidate neighboring node. The second node may send a response to the first node. If the first node determines to establish the backhaul link between the first node and the candidate neighboring node, the first request is used to request the second node to establish the backup backhaul link between the first node and the candidate neighboring node. Alternatively, if the first node determines to delete the backhaul link between the first node and the candidate neighboring node, the first request is used to request the second node to delete the backup backhaul link between the first node and the candidate neighboring node.

In an optional solution, when the first node determines, based on the measurement result, that the condition $M_r - H_{ys} > Thresh$ is met, that is, the first node determines that the entry condition of the event is met, the first node triggers a signal for sending the addition request of the backup backhaul link to the second node, or generates a request message. The signal or the request message indicates another module or process of the first node to send the addition request of the backup backhaul link to the second node. Alternatively, when the condition $M_r+H_{ys}<$Thresh is met, that is, the first node determines that the leave condition of the event is met, the first node triggers a signal for sending the deletion request of the backup backhaul link to the second node, or generates a deletion message. The signal or the deletion message indicates another module or process of the first node to send the deletion request of the backup backhaul link to the second node.

It should be understood that the trigger entry condition may also meet $M_r-H_{ys}\geq$Thresh, and the trigger leave condition may also meet $M_r+H_{ys}\leq$Thresh.

Specifically, after the second node receives the first request sent by the first node, if the first request is used to establish the backup backhaul link between the first node and the candidate neighboring node, the second node determines whether to add the requested candidate neighboring node as a node of the backup backhaul link of the first node. In an optional solution, the second node may reject the addition request of the backup backhaul link of the first node, and the second node sends a first response to the first node. The first response includes an addition response of the backup backhaul link, an addition rejection indication, and a rejection cause value. If the second node accepts the addition request that is of the backup backhaul link and that is sent by the first node, step S611 is performed. A similar operation is performed on the deletion request that is of the backup backhaul link and that is sent by the first node. Details are not described again.

It should be understood that the first response may be further used as a deletion response of the backup backhaul link to indicate a result of deleting the backup backhaul link between the first node and the candidate neighboring node.

If the first request is used by the second node to establish the backup backhaul link between the first node and the candidate neighboring node, when quality of a backhaul link that is being used by the first node is poor, or a capacity of a backhaul link that is being used is insufficient, the second node may enable the backup backhaul link. Therefore, the second node may control a status of the backup backhaul link of the first node, that is, may activate or deactivate the backup backhaul link.

S612: After receiving the first request, the second node sends a second request to the candidate neighboring node, where the second request is used by the candidate neighboring node to establish or delete a bearer to the second node or a user plane function (UPF). If the first request is used to request the second node to establish the backup backhaul link between the first node and the candidate neighboring node, the second request is used by the candidate neighboring node to establish the bearer to the second node or the user plane function. Alternatively, if the first request is used to request the second node to delete the backup backhaul link between the first node and the candidate neighboring node, the second request is used by the candidate neighboring node to delete the bearer to the second node or the user plane function.

As described above, the first request is used by the second node to establish a relationship of the backup backhaul link between the first node and the candidate neighboring node, and the second request is used by the candidate neighboring node to establish the bearer to the second node or the UPF. Because the backhaul link being used by the first node may be instantaneously interrupted due to some reasons, for example, due to a change of an environment or a block, the backup backhaul link needs to be enabled. To reduce a time in which the candidate neighboring node establishes the bearer to the UPF, when the second node sends the second request to the candidate neighboring node to establish the backup backhaul link between the first node and the candidate neighboring node, the candidate neighboring node establishes the bearer to the second node or establishes the bearer to the UPF. The bearer to the second node is established mainly in a dual-connectivity or multi-connectivity manner, to route, to the second node through the candidate neighboring node, data that is sent by the first node through the backup backhaul link, so that the second node may control a status of the backup backhaul link, that is, activate or deactivate the backhaul link. In addition, user plane data transmitted by the first node through the candidate neighboring node is sent to the second node through a bearer between the candidate neighboring node and the second node, and routed by the second node.

However, in another optional solution, when the first node is the layer 3 relay, and when the first node sends data through the candidate neighboring node, the candidate neighboring node may establish the bearer to the UPF for the first node. That is, the data is not forwarded by the second node. In this case, when the candidate neighboring node receives the second request sent by the second node, if the second request is used to establish the backup backhaul link between the first node and the candidate neighboring node, the candidate neighboring node directly establishes the bearer to the UPF, but the bearer that is established by the candidate neighboring node and that is to the UPF is in a deactivated state. If the backhaul link currently used by the first node is unavailable due to a reason such as a change of the environment, the first node may switch to the backup backhaul link, and activate the bearer from the candidate neighboring node to the UPF, to provide a data forwarding channel for the first node.

It should be understood that in the foregoing solution, whether the candidate neighboring node establishes the bearer to the second node or establishes the bearer to the UPF depends on a specific application scenario. If the first node and the candidate neighboring node are layer 2 relays, whether to establish the bearer to the second node or establish the bearer to the UPF is controlled by the second node. To be specific, the second node includes an indication of a data plane route in the first request (used to establish the backup backhaul link between the first node and the candidate neighboring node). The indication is used to indicate whether the candidate neighboring node establishes a route to the second node or a route to the UPF, but the second node may accept or change the indication of the data plane route, and notify the first node of a selection result. If the first node and the candidate neighboring node are layer 3 relays, the first node may also include an indication of the data plane route in the first request (used to establish the backup backhaul link between the first node and the candidate neighboring node). In this case, the second node does not change the indication of the data plane route.

S613: The candidate neighboring node sends a second response to the second node, where the second response includes an addition response of the backup backhaul link or a deletion response of the backup backhaul link. It should be understood that the candidate neighboring node may reject the second node to use the candidate neighboring node as the parent node of the first node. In this case, the second response indicates that the request is rejected.

S614: After receiving the second response sent by the candidate neighboring node, the second node sends the first response to the first node. If the first request is used to establish the backup backhaul link between the first node and the candidate neighboring node, the second node also uses the candidate node as a node of the backup backhaul link of the first node, and activates the backup backhaul link through control signaling when necessary.

In an optional solution, when the first request is a request used to establish the backup backhaul link between the first node and the candidate neighboring node, the first node may request to activate the backup backhaul link of the candidate neighboring node. In this case, the second request sent by the second node to the candidate neighboring node also includes an activation indication. The candidate neighboring node includes an activation status indication in the second response.

In another optional solution, when the first request is used to delete the backup backhaul link between the first node and the candidate neighboring node, the second node may request to deactivate the backup backhaul link of the candidate neighboring node. In this case, a message of the second request sent by the second node to the candidate neighboring node includes a deactivation indication. The candidate neighboring node includes a deactivation status indication in the message of the second response. Optionally, the second node may include a retention time of the backup backhaul link in the second request. The candidate neighboring node starts a timer based on the retention time of the backup backhaul link. When the timer expires and no message for retaining the backup backhaul link of the second node is received, the backup backhaul link is deleted.

After the first node receives the first response sent by the second node, if the first request (used to establish the backup backhaul link between the first node and the candidate neighboring node) is accepted, the first node may switch to the backup backhaul link based on a requirement, or activate the backup backhaul link to establish dual connectivity or multi connectivity for the first node.

In the foregoing technical solution, if the second node accepts the first request sent by the first node, the first response is the same as the second response: and if the second node rejects the first request, the second response does not exist, and the first response is a response of the second node for the first request.

According to the foregoing technical solution, the first node may determine, by receiving the measurement indication of the second node, the measurement result that is of the neighboring node, that is obtained by the terminal through measurement, and that is forwarded by the second node, or the measurement report reported by the terminal, whether to establish or delete the backup backhaul link between the first node and the candidate neighboring node, so that measurement overheads caused by measurement of the first node are reduced, and a new available parent node is found through auxiliary measurement of the terminal. The backup backhaul link enhances availability of the backhaul link of the first node, and when quality of a currently used backhaul link is poor or a bandwidth of the currently used backhaul link is insufficient, quality of the backhaul link can be improved, a new backhaul link can be quickly established, and a service interruption time can be reduced.

Figure 7:
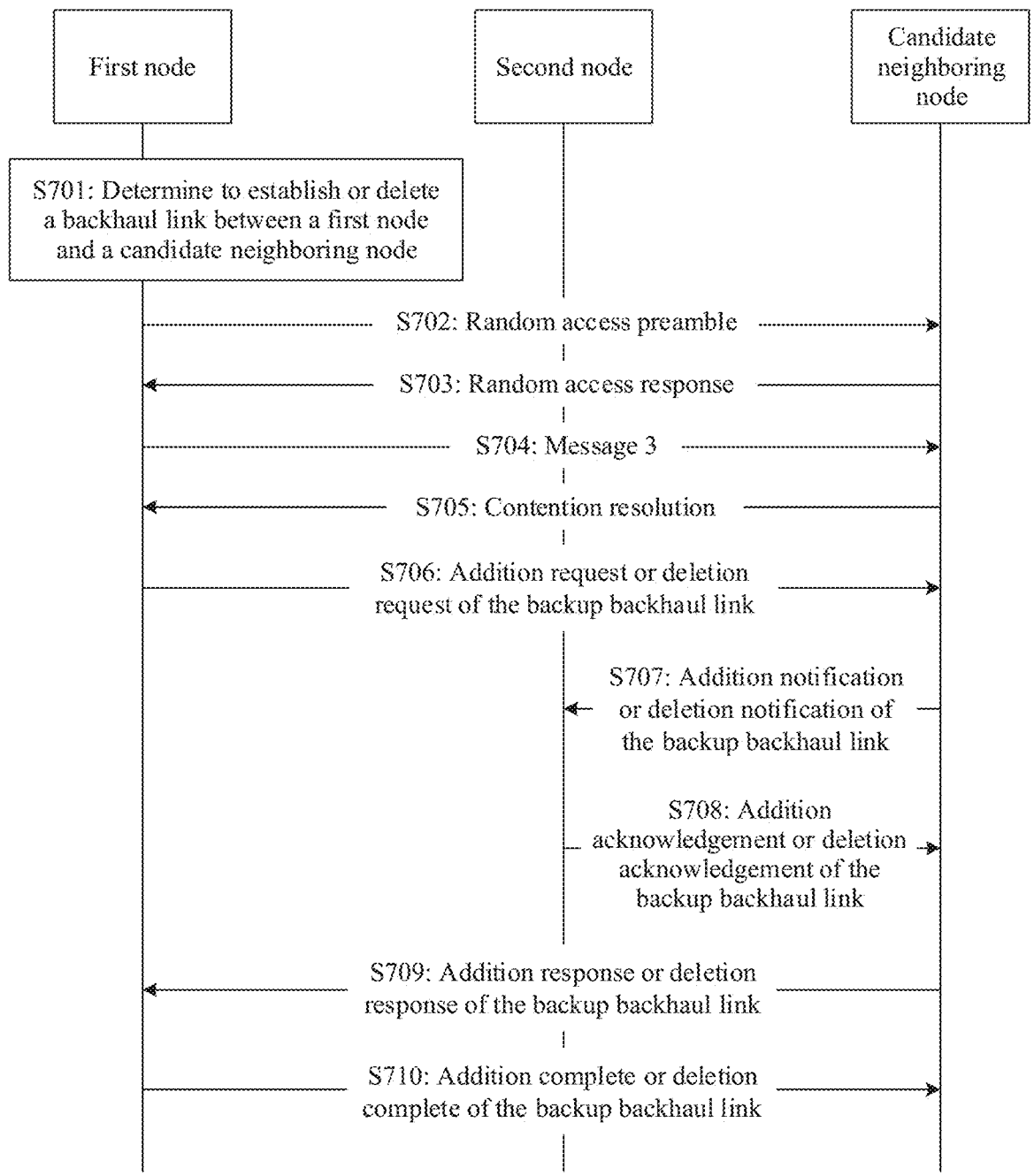
FIG. 7 is a schematic diagram showing that a first node initiates a random access process to one or more candidate neighboring nodes according to an embodiment of this application.

In an optional solution, if the first node determines to establish the backhaul link between the first node and the candidate neighboring node, the first node initiates a random access process to the candidate neighboring node. FIG. 7 is a schematic diagram showing that a first node initiates a random access process to a candidate neighboring node according to an embodiment of this application. The figure further includes that the first node determines to delete a backhaul link between the first node and the candidate neighboring node, and the first node initiates the random access process to the candidate neighboring node. To be specific, whether the first node establishes or deletes the backhaul link between the first node and the candidate neighboring node, the first node may initiate the random access process to the candidate neighboring node. Specific steps areas follows:

S701: Determine to establish or delete the backhaul link between the first node and the candidate neighboring node. A determining manner thereof is the same as that in step S610 in the foregoing embodiment, and details are not described again.

In addition, after the first node determines to establish or delete the backhaul link between the first node and the candidate neighboring node, if the first node establishes the backhaul link between the first node and the candidate neighboring node in a random access manner, the first node further needs to obtain random access information of the candidate neighboring node, including a random access preamble group, a random access resource, and whether a cell is in a blocked state. If the first node deletes the candidate neighboring node, the first node may obtain the random access information when establishing the backhaul link with the candidate neighboring node before, and does not need to obtain the random access information again. However, the first node may also obtain the random access information again when deleting the backhaul link between the first node and the candidate neighboring node, this is mainly to prevent the random access information of the candidate neighboring node from being changed.

S702: The first node sends a random access preamble to the candidate neighboring node. The first node selects, based on the obtained random access information of the candidate neighboring node, a random access preamble for sending. Sending of the random access preamble is well known by a person of ordinary skill in the art, and details are not described.

S703: After receiving the random access preamble sent by the first node, the candidate neighboring node sends a random access response to the first node, where the random access response includes a random access preamble identifier, timing advance (TA) adjustment, and/or a backoff indicator (BI). This step is well known by a person of ordinary skill in the art, and details are not described.

S704: After receiving the random access response of the candidate neighboring node, the first node sends a message 3 to the candidate neighboring node, where the message 3 includes an indication of establishing the backhaul link and an identifier of the first node. The indication of establishing the backhaul link is used to notify the candidate neighboring node that a purpose of random access is to establish the backhaul link, and/or indicate that the first node is a relay node. Optionally, the message 3 may further include an attribute indication of the first node. The attribute indication of the first node indicates that the first node is the relay node. The message 3 may include only one of the indication of establishing the backhaul link and an attribute of the first node.

S705: After receiving the message 3 sent by the first node, the candidate neighboring node sends a contention resolution message to the first node, where the contention resolution message is also referred to as a message 4. The contention resolution message is the same as a conventional contention resolution message, and is well known by a person of ordinary skill in the art, and details are not described.

S706: The first node sends an addition request or a deletion request of the backup backhaul link between the first node and the candidate neighboring node. The addition request or the deletion request of the backup backhaul link may further include an identifier of the second node. A request of the backup backhaul link may further include an activation indication of the backhaul link, used to request whether to activate the backhaul link between the first node and the candidate neighboring node. The addition request of the backup backhaul link may further include an indication indicating whether data plane routing is performed through the second node, and is used to indicate whether the candidate neighboring node establishes a bearer to the second node.

After receiving the addition request or the deletion request of the backup link, the candidate neighboring node determines, based on a current resource situation, whether to accept an establishment request of the backhaul link of the first node.

S707: The candidate neighboring node sends an addition notification or a deletion notification of the backup backhaul link to the second node. The candidate neighboring node notifies the second node that the backup backhaul link between the candidate node and the first node has been established or deleted. The addition notification or the deletion notification of the backup backhaul link includes the identifier of the first node and an identifier of the candidate neighboring node. The addition notification of the backup backhaul link may further include a bearer establishment indication, used to request to establish a bearer between the candidate neighboring node and the second node for the first node. It should be understood that the addition notification or the deletion notification of the backup backhaul link may be two messages, namely, the addition notification of the backup backhaul link and the deletion notification of the backup backhaul link. The addition notification of the backup backhaul link or the deletion notification of the backup backhaul link may also indicate a function of the addition notification of the backup backhaul link or a function of the deletion notification of the backup backhaul link by using a field of a message. For example, in a notification of the backup backhaul link, a field is used to indicate whether the notification of the backup backhaul link is the addition notification of the backup backhaul link or the deletion notification of the backup backhaul link. It should be understood that the name herein is merely an example, and any name of the message with a similar function falls within the protection scope of the present disclosure. The following is the same, and details are not described.

S708: The second node sends an addition acknowledgment or a deletion acknowledgement of the backup backhaul link between the first node and the candidate neighboring node. The message is used to acknowledge, to the second node, to accept the backup backhaul link between the candidate neighboring node and the first node. The second node may also reject to accept the backup backhaul link between the candidate neighboring node and the first node.

It should be understood that the addition acknowledgement or the deletion acknowledgement of the backup backhaul link may be two messages, namely, the addition acknowledgement of the backup backhaul link and the deletion acknowledgement of the backup backhaul link. The addition acknowledgment of the backup backhaul link or the deletion acknowledgement of the backup backhaul link may also indicate a function of the addition acknowledgment of the backup backhaul link or the deletion acknowledgment of the backup backhaul link by using a field of a message. For example, in an acknowledgment of the backup backhaul link, a field may be used to indicate whether the acknowledgement of the backup backhaul link is the addition of the backup backhaul link or the deletion of the backup backhaul link. It should be understood that the name herein is merely an example, and any name of the message with a similar function falls within the protection scope of the present disclosure. The following is the same, and details are not described.

If the addition notification of the backup backhaul link includes a bearer establishment indication, the second node may further include bearer information such as an identifier and a port number of the bearer in the addition acknowledgment of the backup backhaul link. A bearer establishment process is the same as a conventional bearer establishment process of a dual-connectivity X2 interface, and details are not described.

S709: The candidate neighboring node sends an addition response or a deletion response of the backup backhaul link to the first node. If the candidate neighboring node accepts the addition request or the deletion request of the backup backhaul link of the first node, and the second node also accepts to establish the backup backhaul link between the candidate neighboring node and the first node, the addition response or the deletion response of the backup backhaul link includes indication information of accepting the request. If the candidate neighboring node does not accept the addition request or the deletion request of the backup backhaul link of the first node, or the second node does not accept to establish the backup backhaul link between the candidate neighboring node and the first node, the addition response or the deletion response of the backup backhaul link includes indication information of rejecting the request.

The addition response or the deletion response of the backup backhaul link further includes route indication information, used to indicate whether a bearer for user data transmission is established by using the second node or the UPF. The addition response or the deletion response of the backup backhaul link may further include bearer indication information, used to indicate whether the candidate neighboring node establishes a bearer to the second node or establishes a bearer to the UPF. The addition response or the deletion response of the backup backhaul link may further include an activation indication of the backhaul link, used to indicate whether the backhaul link is activated. The addition response or the deletion response of the backup backhaul link may further include a retention time of the backhaul link, used to indicate, when the first node deletes the backhaul link between the first node and the candidate neighboring node, that the backhaul link is to be deleted after a predetermined time. If the first node adds the candidate neighboring node again as the backup backhaul link before the retention time of the backhaul link expires, the candidate neighboring node only needs to simply modify a status of the backup backhaul link, that is, stop the timer, and identify backhaul link as the backup backhaul link, or activate the backup backhaul link according to an instruction.

S710: The first node sends an addition complete message or a deletion complete message of the backup backhaul link between the first node and the candidate neighboring node, to notify the candidate neighboring node that the first node has received the addition response or the deletion response of the backup backhaul link.

According to the foregoing embodiment, the relay node determines, based on a measurement result of the candidate neighboring node, whether to establish a backhaul link between the relay node and the candidate neighboring node, and directly accesses the candidate neighboring node in a random access manner, thereby reducing signaling overheads, reducing a latency of establishing the backhaul link, and helping reduce energy consumption of the first node. A backup link is established by directly accessing the candidate neighboring node, so that a topology and a route of the relay node are optimized.

In an optional solution, after step S705 shown in FIG. 7, the first node may send a measurement configuration request to the candidate neighboring node, to request the candidate neighboring node to send a dedicated reference signal, for example, a CSI-RS, to the first node for measurement, and the first node re-measures the CSI-RS, and re-determines whether to establish or delete the backup backhaul link between the first node and the candidate neighboring node. If the first node determines to continue establishing the backup backhaul link, step S706 is continued. According to this solution, a measurement result of the backhaul link between the first node and the candidate neighboring node may be more accurate, and an established backup backhaul link may be more reliable.

In an optional solution, after step S706 shown in FIG. 7, the candidate neighboring node configures a dedicated measurement reference signal for the first node, to require the first node to perform measurement again and report the measurement result. The candidate neighboring node determines, based on the measurement result reported by the first node, whether to establish or delete the backup backhaul link between the candidate neighboring node and the first node, or the first node determines, based on the measurement result, whether to establish or delete the backup backhaul link between the first node and the candidate neighboring node. If the candidate neighboring node determines to continue establishing or deleting the backup backhaul link, step S707 is continued. Otherwise, step S709 is performed, and establishment of the backhaul link is rejected in the addition response or the deletion response of the backup backhaul link. If determining to continue establishing or deleting the backup backhaul link, the first node sends indication information to the candidate neighboring node, to continue establishing or deleting the backup backhaul link, that is, continue to perform step S707. According to this solution, the measurement result of the backhaul link between the first node and the candidate neighboring node may be more accurate, and an established backup backhaul link may be more reliable.

In an optional solution, step S706 to step S710 in FIG. 7 are added only for the backup backhaul link, and the backup backhaul link is deleted by using the method shown in FIG. 6, that is, the backup backhaul link is deleted through the second node. In a measurement process, if the first node finds that a measurement value of the backup backhaul link between the first node and a candidate neighboring node is less than a configured threshold (for example, the threshold in step S610), and the first node accesses the candidate neighboring node in a random access method, the first node is required to perform sending by using relatively large power, and sending may easily fail. Therefore, sending through the second node may improve a success rate of message sending and reduce power consumption of the first node.

Figure 8A:
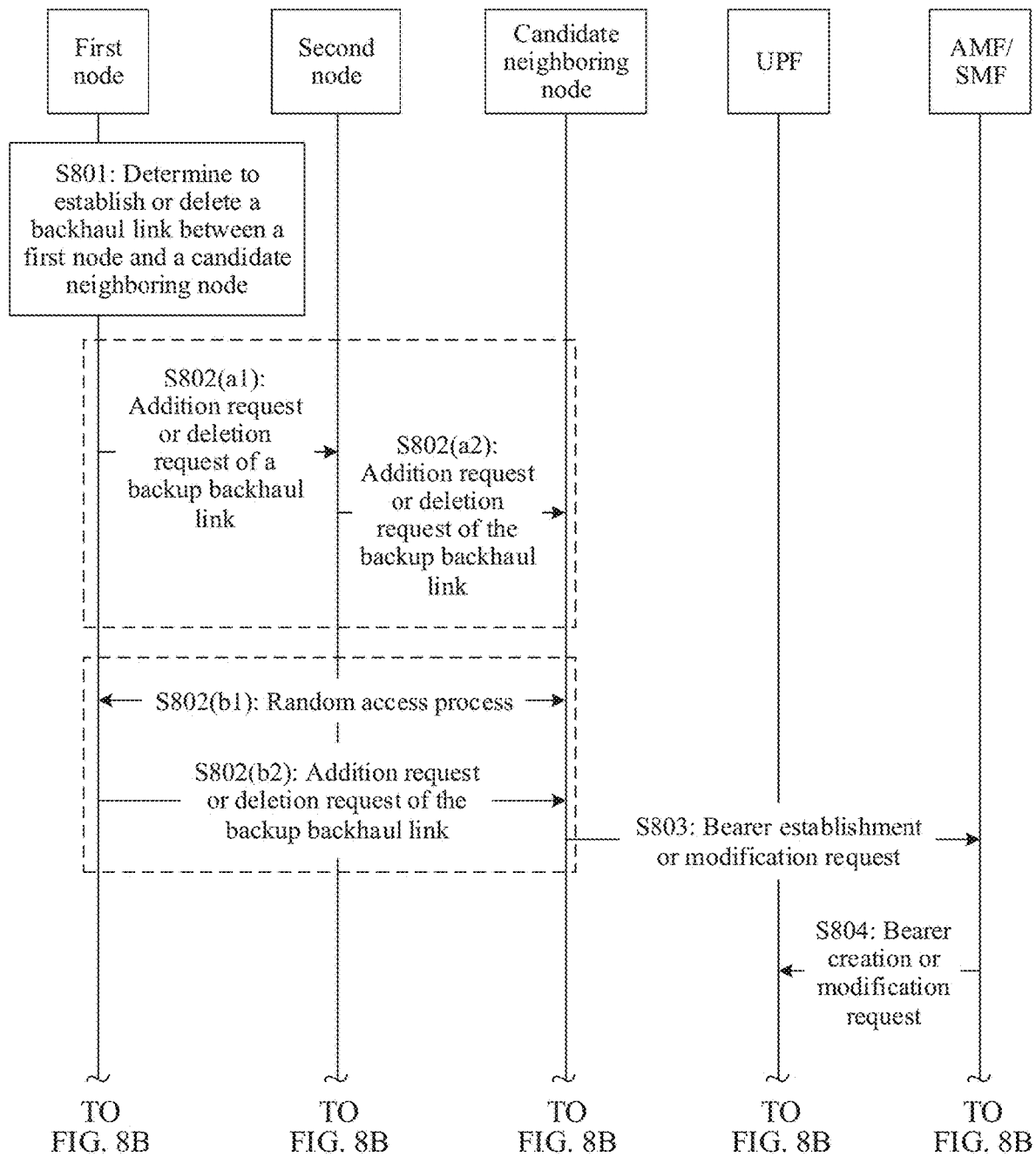
FIG. 8A and FIG. 8B show a procedure in which one or more candidate neighboring nodes establishes a bearer to a UPF according to an embodiment of this application.
Figure 8B:
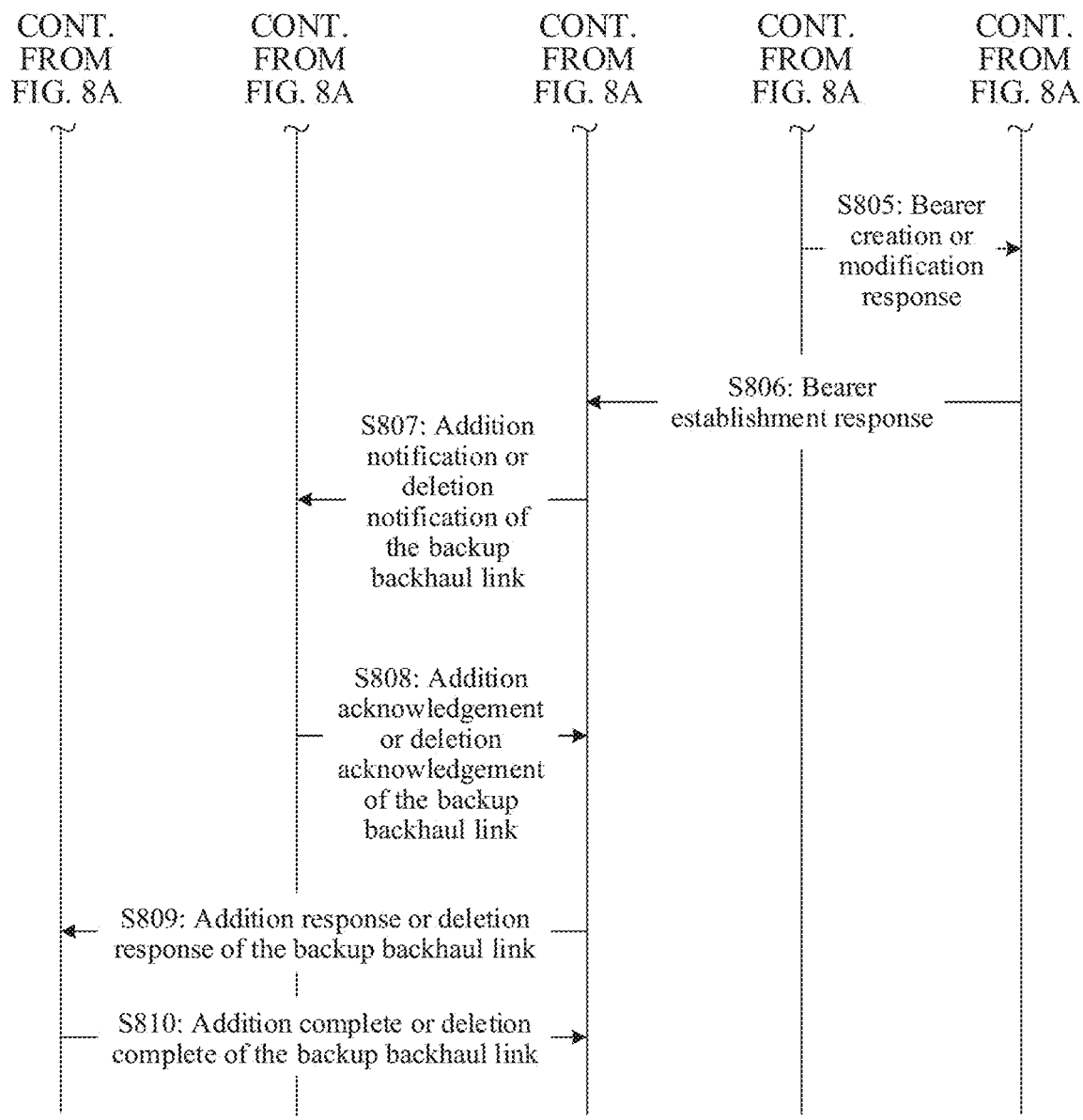

FIG. 8A and FIG. 8B show a procedure in which a candidate neighboring node establishes a bearer to a UPF according to an embodiment of this application. A user plane function is mainly a function network element, for example, a gateway, that provides user plane data routing and forwarding. As described above, a candidate node may establish the bearer according to an indication of a data plane route in an addition request or a deletion request of the backup backhaul link. If the indication of the data plane route in the addition request or the deletion request of the backup backhaul link is to establish the bearer by using the UPF, the candidate neighboring node does not forward the data plane route of the first node through the second node, and the candidate neighboring node establishes a bearer to the UPF, and determines, based on an activation indication of the backhaul link in the addition request or the deletion request of the backup backhaul link, whether to activate the bearer to the UPF. If the addition request or the deletion request of the backup backhaul link does not include the indication of the data plane route, the candidate neighboring node may autonomously select whether to establish a bearer to the second node or establish the bearer to the UPF. Specifically, an access and mobility management function (AMF)/session management function (SMF) in FIG. 8A and FIG. 8B is mainly a control plane network element, and is configured to control an access node, a user, and a gateway. It should be understood that a name of a message in FIG. 8A and FIG. 8B is merely used to indicate a function, and another similar name is used in an actual standard or product implementation. It should not be considered that the name of the message in the figure limits a usage scope of the name of the message. FIG. 8A and FIG. 8B show an example of establishing the bearer to the UPF. The steps are as follows.

S801: Same as step S701, and details are not described again.

S802(a1): The first node sends the addition request or the deletion request of the backup backhaul link to the second node. If the first node determines to request, through the second node, to establish or delete the backup backhaul link between the first node and the candidate neighboring node, steps S802(a1) and S802(a2) are performed. If the first node establishes or deletes the backup backhaul link between the first node and the candidate neighboring node in a random access manner through the candidate neighboring node, steps S802(a1) and S802(a2) are not performed, and steps S802(b1) and S802(b2) are performed. However, if steps S802(a1) and S802(a2) are performed, the following steps S802(b1) and S802(b2) are not performed. Specifically, this step is the same as S611, and details are not described again.

S802(a2): The second node sends the addition request or the deletion request of the backup backhaul link between the second node and the candidate neighboring node. If step S802(a1) is performed, step S802(a2) is performed. It should be understood that the candidate neighboring node herein is a candidate neighboring node that is determined by the first node to establish or delete the backup backhaul link, that is, a candidate neighboring node in the addition request or the deletion request of the backup backhaul link. Step S802(a2) is the same as step S612, and details are not described again.

As described above, if S802(a1) is not performed, S802(a2) is also not performed.

S802(b1): The first node initiates a random access process to the candidate neighboring node. Herein, a step is used to replace the random access process. This is merely intended to simplify description. For details, refer to steps S702 to S705. Details are not described again. It should be understood that if the first node establishes or deletes the backup backhaul link between the first node and the candidate neighboring node in a random access manner through the candidate neighboring node, step S802(b1) is performed, and steps S802(a1) and S802(a2) are not performed.

S802(b2): The first node sends the addition request or the deletion request of the backup backhaul link between the first node and the candidate neighboring node. For details, refer to S706. Details are not described again.

If step S802(b1) is performed, step S802(b2) is performed. Otherwise, this step is not performed either. That is, in the foregoing steps, either S802(a1) and S802(a2) or S802(b1) and S802(b2) are performed.

S803: The candidate neighboring node sends a bearer setup request or a bearer modification request to an AMF/SMF. The bearer setup request includes at least one of the following parameters: an identifier of the first node, an identifier of the candidate neighboring node, a bearer identifier of the candidate neighboring node, a port number of the candidate neighboring node, an identifier of the UPF, and an access point name (APN). The bearer setup request may further include a bearer activation indication, used to indicate whether the established bearer needs to be activated. If the first node sends the deletion request of the backup backhaul link, the candidate neighboring node sends the bearer modification request to the AMF/SMF, where the bearer modification request includes a bearer deletion indication. Optionally, if the first node sends the deletion request of the backup backhaul link, the candidate neighboring node may directly enter step S807, start a timer, and perform steps S803 to S806 after the timer expires.

S804: After receiving the bearer setup request or the bearer modification request, the AMF/SMF sends a bearer creation or bearer modification request to a UPF, namely, may be the bearer creation request or the bearer modification request, where the bearer modification request may be used to delete a bearer.

S805: The UPF sends a bearer creation response or a bearer modification response to the AMF/SMF. The bearer creation response or the bearer modification response includes at least one of the following parameters: a bearer identifier allocated by the UFP for the bearer, an identifier of the UFP, an identifier of the first node, an identifier of the candidate neighboring node, a port number, a QoS parameter, and a status of the bearer (activated or not).

S807 to S810: Same as S707 to S710, and details are not described again.

According to the foregoing embodiment, the candidate neighboring node may establish a bearer to the UPF, and may activate the bearer at any time by using the established bearer, thereby reducing impact caused by service interruption of the first node because the backhaul link of the first node is unavailable, so that fast route switching may be implemented, a service interruption latency may be reduced, and service quality may be improved.

The foregoing mainly describes the solutions provided in the embodiments of this application from a perspective of interaction between network elements. It may be understood that to implement the foregoing functions, each network element, for example, the first node or the second node, includes corresponding hardware structures and/or software modules for performing the functions. A person skilled in the art should easily be aware that, in combination with the examples described in the embodiments disclosed in this specification, network elements and algorithms steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, function modules in the first node and the second node may be obtained through division based on the foregoing method examples. For example, function modules may be obtained through division based on each corresponding function, or two or more functions may be integrated into one processing module. The integrated module may be implemented in a form of hardware, or may be implemented in a form of a software function module. It should be noted that in the embodiments of this application, module division is an example, and is merely a logical function division. In actual implementation, another division manner may be used. In addition, based on the foregoing method examples, there may be a plurality of candidate neighboring nodes, and the plurality of candidate neighboring nodes have a same function and a same corresponding function module. In the following embodiments, only one candidate neighboring node is used as an example for description, but it should be understood that a same first node may have a plurality of candidate neighboring nodes.

Figure 9:
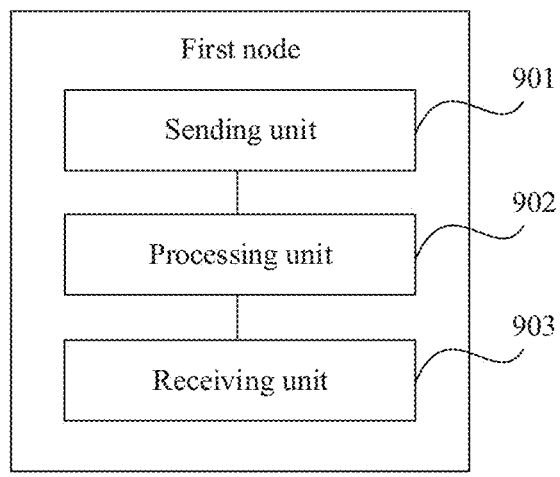
FIG. 9 is a possible schematic structural diagram of a first node according to an embodiment of this application.

When each function module is obtained through division based on each corresponding function. FIG. 9 is a possible schematic structural diagram of a first node in the foregoing embodiments according to an embodiment of this application. The first node includes a processing unit 902 and a sending unit 903. The processing unit 901 is configured to support step S604, S609, or S610 in FIG. 6, step S701 in FIG. 7, and S801 in FIG. 8A. The sending unit 901 is configured to support the first node in performing S605 or S611 in FIG. 6, step S702, S704, S706, or S710 in FIG. 7, and step S802(a1), S802(b2), or S810 in FIG. 8B. The first node may further include a receiving unit 903, configured to support the first node in performing S601, S602(a), S603, S608, or S614 in FIG. 6, step S703, S705, or S709 in FIG. 7, and step S802(b1) or S809 in FIG. 8B.

In hardware implementation, the processing unit 902 may be a processor, the sending unit 901 may be a transmitter, and the receiving unit 903 may be a receiver. The receiver and the transmitter may form a communications interface.

Figure 10:
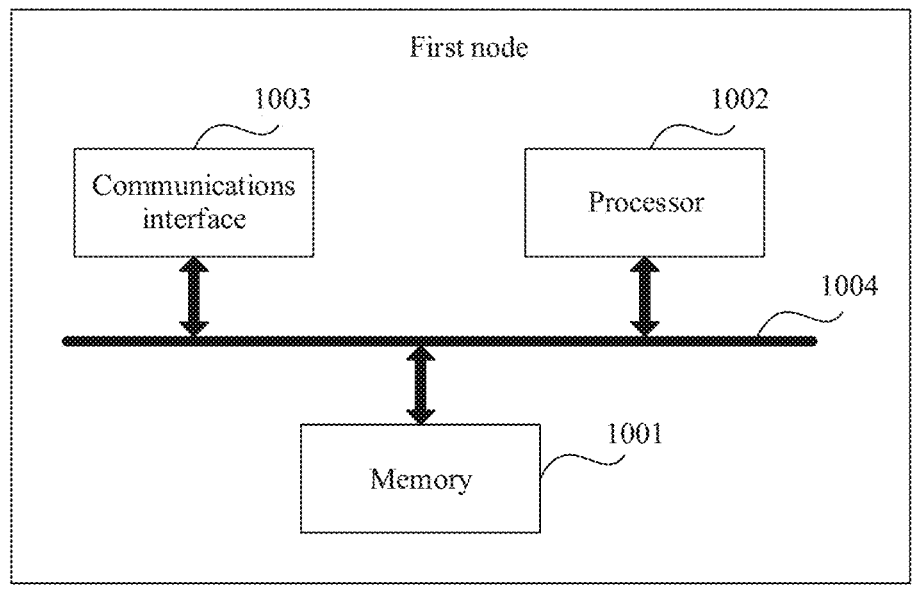
FIG. 10 is a schematic diagram of a possible logical structure of a first node according to an embodiment of this application.

FIG. 10 is a schematic diagram of a possible logical structure of a first node in the foregoing embodiments according to an embodiment of this application. The first node includes a processor 1002. In this embodiment of this application, the processor 1002 is configured to control and manage an action of the first node. For example, the processor 1002 is configured to support the first node in performing step S604, S609, or S610 in FIG. 6, step S701 in FIG. 7, and S801 in FIG. 8A The first node may further include a memory 1001 and a communications interface 1003. The processor 1002, the communications interface 1003, and the memory 1001 may be connected to each other or connected to each other through a bus 1004. The communications interface 1003 is configured to support the first node in performing communication, and the memory 1001 is configured to store program code and data of the first node. The processor 1002 invokes the code stored in the memory 1001 to perform control management. The memory 1001 may be coupled to or not coupled to the processor.

The processor 1002 may be a central processing unit, a general-purpose processor, a digital signal processor, an application-specific integrated circuit, a field programmable gate array or another programmable logical device, a transistor logical device, a hardware component, or any combination thereof. The processor 1002 may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The bus 1004 may be a peripheral component interconnect (PCI) bus, an extended industry standard architecture (EISA) bus, and the like. The bus may be classified into an address bus, a data bus, a control bus, and the like. For ease of representation, only one thick line is used to represent the bus in FIG. 10, but this does not mean that there is only one bus or only one type of bus.

Figure 11:
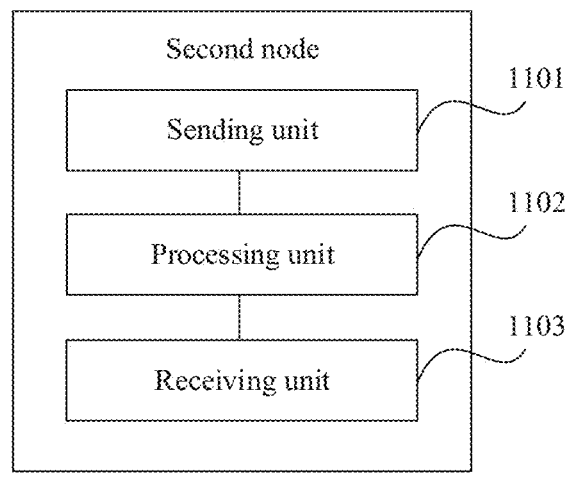
FIG. 11 is a possible schematic structural diagram of a second node according to an embodiment of this application.

When each function module is obtained through division based on each corresponding function, FIG. 11 is a possible schematic structural diagram of a second node in the foregoing embodiments according to an embodiment of this application. The second node includes a sending unit 1101 and a receiving unit 1103. The sending unit 1101 is configured to support the second node in performing S601, S603, S606, S608, S612, or S614 in FIG. 6, step S708 in FIG. 7, and step S802(a2) and S808 in FIG. 8A and FIG. 8B. The receiving unit 1103 is configured to support the second node in performing S602(b), S605, S607, S611, and S613 in FIG. 6, and step S802(a1) or S807 in FIG. 8A and FIG. 8B. The second node may further include a processing unit 1102, configured to support the second node in determining, after the second node receives a measurement report sent by a terminal, a potential neighboring node in a measurement indication, a backhaul link measurement threshold configured for the first node, or whether to accept an addition request that is of a backup backhaul link and that is sent by the first node or a candidate neighboring node.

In hardware implementation, the processing unit 1102 may be a processor, the sending unit 1101 may be a transmitter, and the receiving unit 1103 may be a receiver. The receiver and the transmitter may form a communications interface.

Figure 12:
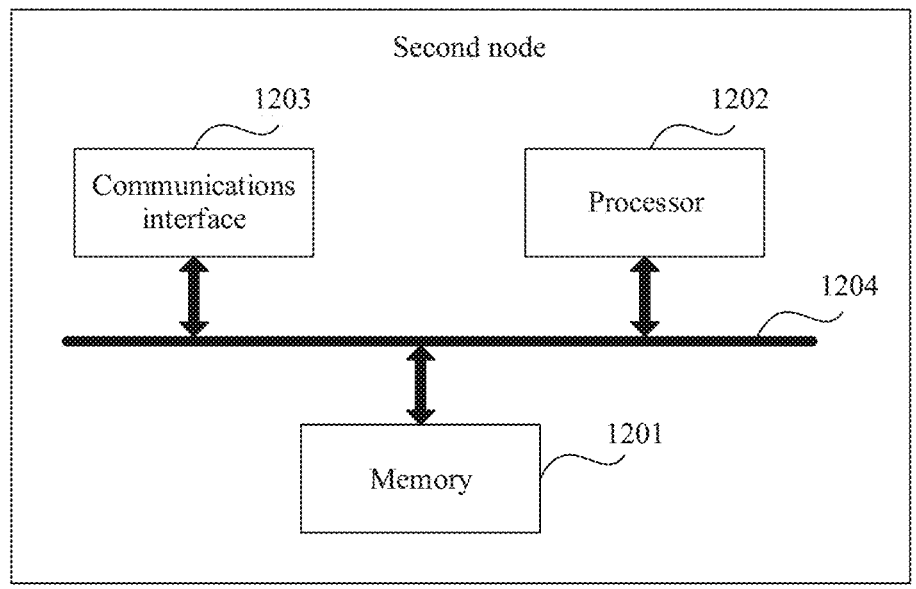
FIG. 12 is a schematic diagram of a possible logical structure of a second node according to an embodiment of this application.

FIG. 12 is a schematic diagram of a possible logical structure of a second node in the foregoing embodiments according to an embodiment of this application. The second node includes a processor 1202. In this embodiment of this application, the processor 1202 is configured to control and manage an action of the second node. For example, the processor 1202 is configured to support the second node in determining a potential neighboring node in a measurement indication, or determining a backhaul link measurement threshold t configured for a first node, or determining whether to accept an addition request that is of a backup backhaul link and that is sent by the first node or a candidate neighboring node. The second node may further include a memory 1201 and a communications interface 1203. The processor 1202, the communications interface 1203, and the memory 1201 may be connected to each other or connected to each other through a bus 1204. The communications interface 1203 is configured to support the second node in performing communication. The memory 1201 is configured to store program code and data of the second node. The processor 1202 invokes the code stored in the memory 1201 to perform control management. The memory 1201 may be coupled to or not coupled to the processor.

The processor 1202 may be a central processing unit, a general-purpose processor, a digital signal processor, an application-specific integrated circuit, a field programmable gate array or another programmable logical device, a transistor logical device, a hardware component, or any combination thereof. The processor 1202 may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The bus 1204 may be a PCI bus, an EISA bus, and the like. The bus may be classified into an address bus, a data bus, a control bus, and the like. For ease of representation, only one thick line is used to represent the bus in FIG. 12, but this does not mean that there is only one bus or only one type of bus.

Figure 13:
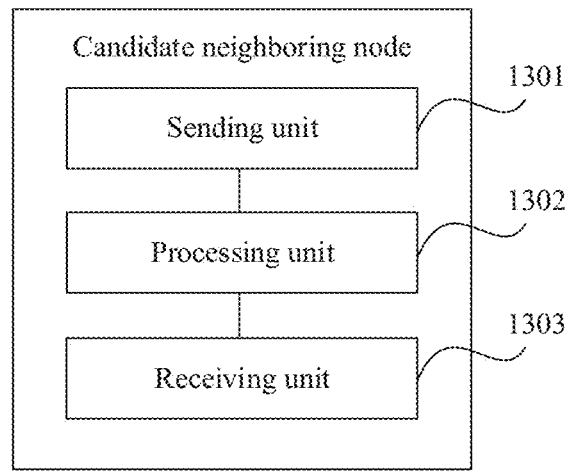
FIG. 13 is a possible schematic structural diagram of one or more candidate neighboring nodes according to an embodiment of this application.

When each function module is obtained through division based on each corresponding function, FIG. 13 is a possible schematic structural diagram of a candidate neighboring node in the foregoing embodiments according to an embodiment of this application. The candidate neighboring node includes a sending unit 1301 and a receiving unit 1303. The sending unit 1301 is configured to support the candidate neighboring node in performing S607 or S613 in FIG. 6, step S703, S705, S707, or S709 in FIG. 7, and step S803, S807, or S809 in FIG. 8A and FIG. 8B. The receiving unit 1303 is configured to support the candidate neighboring node in performing S606 and S612 in FIG. 6, step S702, S704, S706, S708, or S710 in FIG. 7, and S802(a2), S802(b1), S802(b2), S806, S808, or S810 in FIG. 8A and FIG. 8B. The candidate neighboring node may further include a processing unit 1302, configured to support the candidate neighboring node in configuring a CSI-RS resource for a first node based on a received measurement configuration request, determining whether to accept an addition request that is of a backup backhaul link and that is sent by a second node, determining whether to accept an addition request of a backup backhaul link of the first node, or determining to establish a bearer to a UPF or a bearer to the second node.

In hardware implementation, the processing unit 1302 may be a processor, the sending unit 1301 may be a transmitter, and the receiving unit 1303 may be a receiver. The receiver and the transmitter may form a communications interface.

Figure 14:
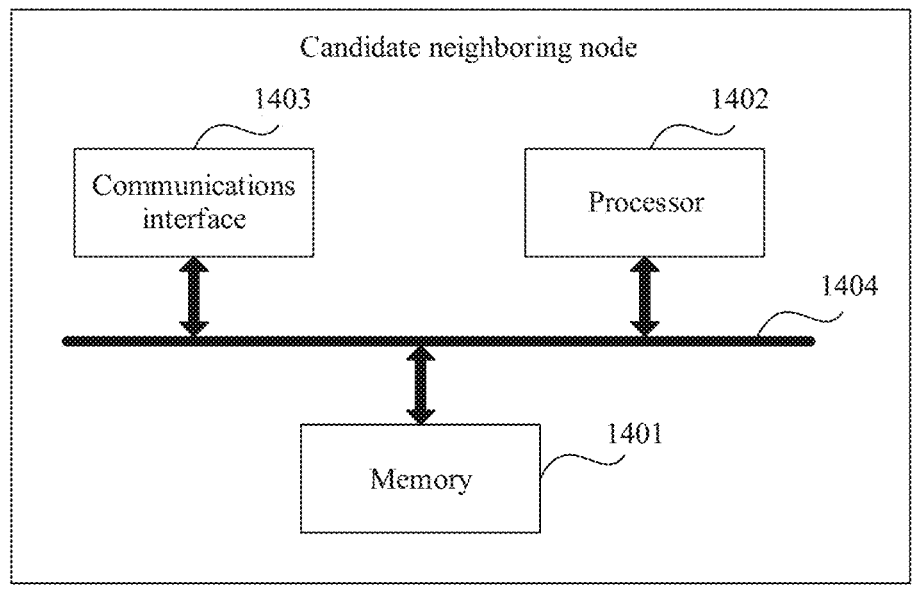
FIG. 14 is a schematic diagram of a possible logical structure of one or more candidate neighboring nodes according to an embodiment of this application.

FIG. 14 is a schematic diagram of a possible logical structure of a candidate neighboring node in the foregoing embodiments according to an embodiment of this application. The candidate neighboring node includes a processor 1402. In this embodiment of this application, the processor 1402 is configured to control and manage an action of a second node. For example, the processor 1402 is configured to support the candidate neighboring node in configuring a CSI-RS resource for a first node, or determining whether to accept an addition request that is of a backup backhaul link and that is sent by the second node, or determining whether to accept an addition request of a backup backhaul link of the first node, or determining to establish a bearer to a UPF or a bearer to the second node. The candidate neighboring node may further include a memory 1401 and a communications interface 1403. The processor 1402, the communications interface 1403, and the memory 1401 may be connected to each other or connected to each other through a bus 1404. The communications interface 1403 is configured to support the candidate neighboring node in performing communication. The memory 1401 is configured to store program code and data of the candidate neighboring node. The processor 1402 invokes the code stored in the memory 1401 to perform control management. The memory 1401 may be coupled to or not coupled to the processor.

The processor 1402 may be a central processing unit, a general-purpose processor, a digital signal processor, an application-specific integrated circuit, a field programmable gate array or another programmable logical device, a transistor logical device, a hardware component, or any combination thereof. The processor 1402 may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The bus 1404 may be a PCI bus, an EISA bus, and the like. The bus may be classified into an address bus, a data bus, a control bus, and the like. For ease of representation, only one thick line is used to represent the bus in FIG. 14, but this does not mean that there is only one bus or only one type of bus.

In another embodiment of this application, a readable storage medium is further provided. The readable storage medium stores a computer execution instruction. When a device (which may be a single-chip microcomputer, a chip, or the like) or a processor performs steps of the first node, the second node, and the candidate neighboring node in the backhaul link maintenance method provided in FIG. 6, FIG. 7, and FIG. 8A and FIG. 8B, the computer execution instruction in a storage medium is read. The readable storage medium may include: any medium that can store program code, such as a USB flash drive, a removable hard disk, a read-only memory, a random access memory, a magnetic disk, or an optical disc.

Another embodiment of this application further provides a computer program product. The computer program product includes a computer execution instruction, and the computer execution instruction is stored in a computer-readable storage medium. At least one processor of a device may read the computer execution instruction from the computer-readable storage medium, and when the at least one processor executes the computer execution instruction, the device is enabled to implement a step of the first node, the second node, and the candidate neighboring node in the resource configuration method provided in FIG. 6. FIG. 7, and FIG. 8A and FIG. 8B.

Another embodiment of this application further provides a communications system. The communications system includes a plurality of devices, and the plurality of devices include a first node, a second node, and a candidate neighboring node. The first node may be the first node provided in FIG. 6, FIG. 7, or FIG. 8A and FIG. 8B, and is configured to perform the steps of the first node in the link maintenance method provided in FIG. 6, FIG. 7, or FIG. 8A and FIG. 8B; and/or the second node may be the second node provided in FIG. 6, FIG. 7, or FIG. 8A and FIG. 8B, and is configured to perform the steps of the second node in the link maintenance method provided in FIG. 6, FIG. 7, or FIG. 8A and FIG. 8B. It should be understood that the communications system may include a plurality of first nodes, that is, the second node may include a plurality of first nodes, and the plurality of first nodes perform a same or similar function.

In this embodiment of this application, after the first node sends an addition request or a deletion request of a backup backhaul link to the second node, the second node adds or deletes the backup backhaul link for the first node. In this way, a problem that a backhaul link is unavailable in a multi-hop relay network due to an instantaneous change of network traffic or an instantaneous interruption of a high-frequency link is resolved. By maintaining the backup backhaul link, a delay or a data transmission interruption time caused by poor quality or interruption of the backhaul link may be reduced, and transmission efficiency of a relay node may be improved through the backup backhaul link.

It should be finally noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A communications apparatus, wherein the communications apparatus is a first node and comprises:
    a processor, configured to:
        determine one or more candidate neighboring nodes to be measured,
        measure the one or more candidate neighboring nodes, and
        determine whether to establish or delete a backup backhaul link between the first node and the one or more candidate neighboring nodes; and
    a transmitter, configured to send a request to a second node, wherein the request is used to request the second node to establish or delete the backup backhaul link between the first node and the one or more candidate neighboring nodes.

2. The communications apparatus according to claim 1, further comprising:
    a receiver, configured to receive a backhaul link measurement threshold configured by the second node, wherein the backhaul link measurement threshold is used by the first node to determine backhaul link quality.

3. The communications apparatus according to claim 2, wherein:
    the receiver is further configured to receive a measurement result that is of a potential neighboring node and that is sent by a terminal, wherein the measurement result of the potential neighboring node is used by the first node to determine the one or more candidate neighboring nodes.

4. The communications apparatus according to claim 1, wherein the receiver is further configured to receive a measurement indication sent by the second node, wherein the measurement indication comprises an identifier of a potential neighboring node, and the identifier of the potential neighboring node is used by the first node to determine the one or more candidate neighboring nodes.

5. The communications apparatus according to claim 1, further comprising:
    the processor is further configured to determine to establish a backhaul link between the first node and the one or more candidate neighboring nodes; and
    the transmitter is configured to initiate a random access process to the one or more candidate neighboring nodes.

6. The communications apparatus according to claim 1, wherein
    the processor is configured to determine to establish the backup backhaul link between the first node and the one or more candidate neighboring nodes when a condition $M_r - H_{ys} > \text{Thresh}$ is met, wherein $M_r$ is the measurement result of the one or more candidate neighboring nodes by the first node, $H_{ys}$ is an event hysteresis parameter, and Thresh is the backhaul link measurement threshold; or
    the processor is configured to determine to delete the backup backhaul link between the first node and the one or more candidate neighboring nodes when a condition $M_r+H_{ys}<Thresh$ is met.

7. A communications apparatus, wherein the communications apparatus is a second node and comprises:
   a receiver, configured to receive a first request sent by a first node, wherein the first request is used to request the second node to establish or delete a backup backhaul link between the first node and one or more candidate neighboring nodes; and
   a transmitter, configured to send a response to the first node.

8. The communications apparatus according to claim 7, wherein the transmitter is further configured to send a backhaul link measurement threshold to the first node, wherein the backhaul link measurement threshold is used by the first node to determine backhaul link quality.

9. The communications apparatus according to claim 7, wherein the transmitter is further configured to send a measurement indication to the first node, wherein the measurement indication comprises an identifier of a potential neighboring node, and the identifier of the potential neighboring node is used by the first node to determine the one or more candidate neighboring nodes.

10. The communications apparatus according to claim 7, wherein
    the transmitter is further configured to send a second request to the one or more candidate neighboring nodes, wherein the second request is used by the one or more candidate neighboring nodes to establish or delete a bearer to the second node or a user plane function.

11. A link maintenance method, comprising:
    determining, by a first node, one or more candidate neighboring nodes to be measured;
    measuring, by the first node, the one or more candidate neighboring nodes;
    determining, by the first node based on a measurement result, whether to establish or delete a backup backhaul link between the first node and the one or more candidate neighboring nodes; and
    sending, by the first node, a request to a second node, wherein the request is used to request the second node to establish or delete the backup backhaul link between the first node and the one or more candidate neighboring nodes.

12. The method according to claim 11, further comprising:
    receiving, by the first node, a backhaul link measurement threshold configured by the second node, wherein the backhaul link measurement threshold is used by the first node to determine backhaul link quality.

13. The method according to claim 11, comprising:
    receiving, by the first node, a measurement indication sent by the second node, wherein the measurement indication comprises an identifier of a potential neighboring node, and the identifier of the potential neighboring node is used by the first node to determine the one or more candidate neighboring nodes.

14. The method according to claim 11, further comprising:
    initiating, by the first node, a random access process to the one or more candidate neighboring nodes if the first node determines to establish a backhaul link between the first node and the one or more candidate neighboring nodes.

15. A link maintenance method, comprising:
    receiving, by a second node, a first request sent by a first node, wherein the first request is used to request the second node to establish or delete a backup backhaul link between the first node and one or more candidate neighboring nodes; and
    sending, by the second node, a response to the first node.

16. The method according to claim 15, further comprising:
    sending, by the second node, a backhaul link measurement threshold to the first node, wherein the backhaul link measurement threshold is used by the first node to determine backhaul link quality.

17. The method according to claim 15, further comprising:
    sending, by the second node, a measurement indication to the first node, wherein the measurement indication comprises an identifier of a potential neighboring node, and the identifier of the potential neighboring node is used by the first node to determine the one or more candidate neighboring nodes.

18. The method according to claim 15, further comprising:
    sending, by the second node, a second request to the one or more candidate neighboring nodes, wherein the second request is used by the one or more candidate neighboring nodes to establish or delete a bearer to the second node or a user plane function.

19. A first apparatus, comprising a processor and
    a memory coupled to the processor and having processor-executable instructions stored thereon, which when executed by the processor, cause the processor to:
    determine, by the first apparatus, one or more candidate neighboring apparatuses to be measured;
    measure, by the first apparatus, the one or more candidate neighboring apparatuses;
    determine, by the first apparatus based on a measurement result, whether to establish or delete a backup backhaul link between the apparatus and the one or more candidate neighboring apparatuses; and
    send, by the first apparatus, a request to a second apparatus, wherein the request is used to request the second apparatus to establish or delete the backup backhaul link between the first apparatus and the one or more candidate neighboring apparatuses.

20. A second apparatus, comprising a processor and
    a memory coupled to the processor and having processor-executable instructions stored thereon, which when executed by the processor, cause the processor to:
    receive, by a second apparatus, a first request sent by a first apparatus, wherein the first request is used to request the second apparatus to establish or delete a backup backhaul link between the first apparatus and one or more candidate neighboring apparatuses; and
    send, by the second apparatus, a response to the first apparatus.

\* \* \* \* \*